US 9,558,212 B2
Jan. 31, 2017

(12) United States Patent
Nakamura et al.

(54) APPARATUS, IMAGE PROCESSING METHOD AND COMPUTER-READABLE STORAGE MEDIUM FOR OBJECT IDENTIFICATION BASED ON DICTIONARY INFORMATION

(71) Applicant: CANON KABUSHIKI KAISHA, Tokyo (JP)

(72) Inventors: Takashi Nakamura, Yokohama (JP); Hiroyasu Kunieda, Yokohama (JP); Tetsuya Suwa, Yokohama (JP); Takashi Fujita, Kawasaki (JP); Kiyoshi Umeda, Kawasaki (JP); Yusuke Hashii, Tokyo (JP); Hiroyuki Sakai, Chigasaki (JP); Naoki Sumi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 679 days.

(21) Appl. No.: 13/932,686

(22) Filed: Jul. 1, 2013

(65) Prior Publication Data
US 2014/0010458 A1    Jan. 9, 2014

(30) Foreign Application Priority Data

Jul. 9, 2012 (JP) ................................ 2012-154010

(51) Int. Cl.
*G06K 9/46* (2006.01)
*G06F 17/30* (2006.01)

(52) U.S. Cl.
CPC ..... *G06F 17/30244* (2013.01); *G06F 17/3025* (2013.01)

(58) Field of Classification Search
CPC ....................... G06F 17/30244; G06F 17/3025
See application file for complete search history.

(56) References Cited

U.S. PATENT DOCUMENTS

| 5,218,387 A | 6/1993 | Ueno et al. |
| 5,881,214 A | 3/1999 | Morisawa et al. |
| 6,885,760 B2 | 4/2005 | Yamada et al. |
| 6,895,103 B2 | 5/2005 | Chen et al. |

(Continued)

FOREIGN PATENT DOCUMENTS

| JP | 05-197793 A | 8/1993 |
| JP | 08-063597 A | 3/1996 |

(Continued)

OTHER PUBLICATIONS

U.S. Appl. No. 13/934,007, filed Jul. 2, 2013, Applicant: Fujita.

(Continued)

*Primary Examiner* — Nirav G Patel
(74) *Attorney, Agent, or Firm* — Fitzpatrick, Cella, Harper & Scinto

(57) ABSTRACT

An apparatus extracts feature information from an object of image data. The apparatus registers the extracted feature information in a dictionary. The apparatus refers to the dictionary and determines a similarity between feature information registered in the dictionary and the extracted feature information. The apparatus does not use, of feature information to be registered in the dictionary, feature information not satisfying a predetermined evaluation criterion in similarity determination.

19 Claims, 18 Drawing Sheets

(56) References Cited

U.S. PATENT DOCUMENTS

| | | |
|---|---|---|
| 6,965,684 B2 | 11/2005 | Chen et al. |
| 7,593,551 B2 | 9/2009 | Kamei |
| 7,699,423 B2 | 4/2010 | Suwa et al. |
| 2003/0039380 A1* | 2/2003 | Sukegawa ............ G06K 9/6255 382/118 |
| 2005/0134907 A1 | 6/2005 | Obuchi et al. |
| 2005/0248655 A1 | 11/2005 | Kitamura et al. |
| 2007/0189585 A1* | 8/2007 | Sukegawa .......... G06K 9/00221 382/118 |
| 2010/0067027 A1 | 3/2010 | Kunieda |
| 2010/0232658 A1 | 9/2010 | Omoto et al. |
| 2010/0260415 A1 | 10/2010 | Sakai et al. |
| 2010/0295998 A1 | 11/2010 | Sakai et al. |
| 2012/0099762 A1 | 4/2012 | Kunieda |
| 2013/0100504 A1 | 4/2013 | Suwa et al. |

FOREIGN PATENT DOCUMENTS

| | | |
|---|---|---|
| JP | 08-77334 A | 3/1996 |
| JP | 2541688 B | 10/1996 |
| JP | 11-053525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 2003-141542 A | 5/2003 |
| JP | 2003-187229 A | 7/2003 |
| JP | 3469031 B2 | 11/2003 |
| JP | 2005-084824 A | 3/2005 |
| JP | 2006-180078 A | 7/2006 |
| JP | 2006-227699 A | 8/2006 |
| JP | 2010-033151 A | 2/2010 |
| JP | 2010-045770 A | 2/2010 |
| JP | 2010-251999 A | 11/2010 |
| JP | 2010-273144 A | 12/2010 |

OTHER PUBLICATIONS

U.S. Appl. No. 13/934,001, filed Jul. 2, 2013, Applicant: Kajiwara.
U.S. Appl. No. 13/922,004, filed Jun. 19, 2013. Applicants: Wakako Tanaka, et al.
Office Action dated Jul. 13, 2015 in U.S. Appl. No. 13/934,007.
Iwayama, et al, "Online handwriting character recognition combining adaptive classification with adaptive context processing", IPSJ SIG Technical Reports, Japan, Information Processing Society of Japan, vol. 2001, No. 1 (2001).

* cited by examiner

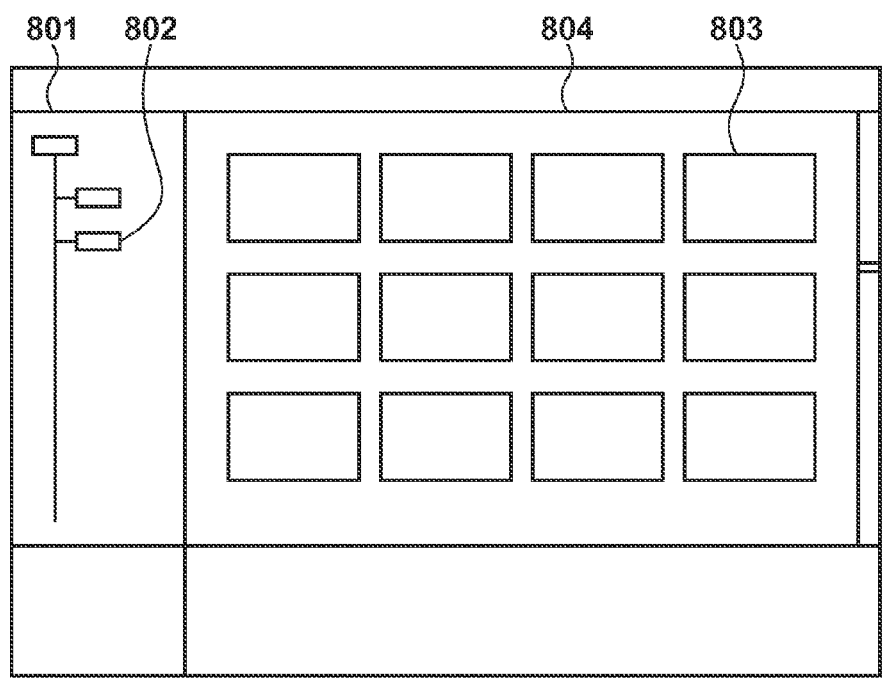

FIG. 9

| FaceID | Reference Count | Activation | NameInfo | Property | ImageID | FaceInfo |
|---|---|---|---|---|---|---|
| FaceID | Reference Count | Activation | NameInfo | Property | ImageID | FaceInfo |
| FaceID | Reference Count | Activation | NameInfo | Property | ImageID | FaceInfo |

FIG. 12

| 1/9 | 1/9 | 1/9 |
|-----|-----|-----|
| 1/9 | 1/9 | 1/9 |
| 1/9 | 1/9 | 1/9 |

FIG. 18

| Category ID | Reference Count | Activation | NameInfo | Property | Ideal Feature | FaceID_00 | ... | FaceID_04 |
|---|---|---|---|---|---|---|---|---|

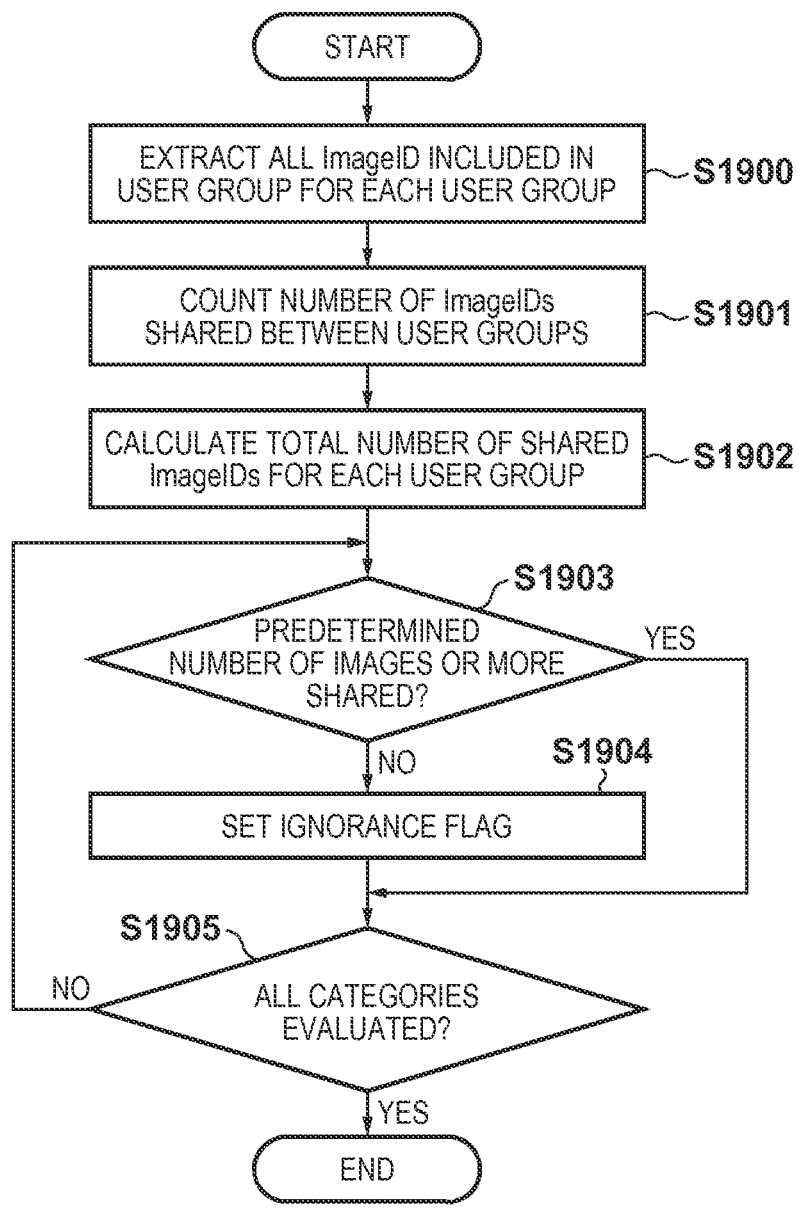

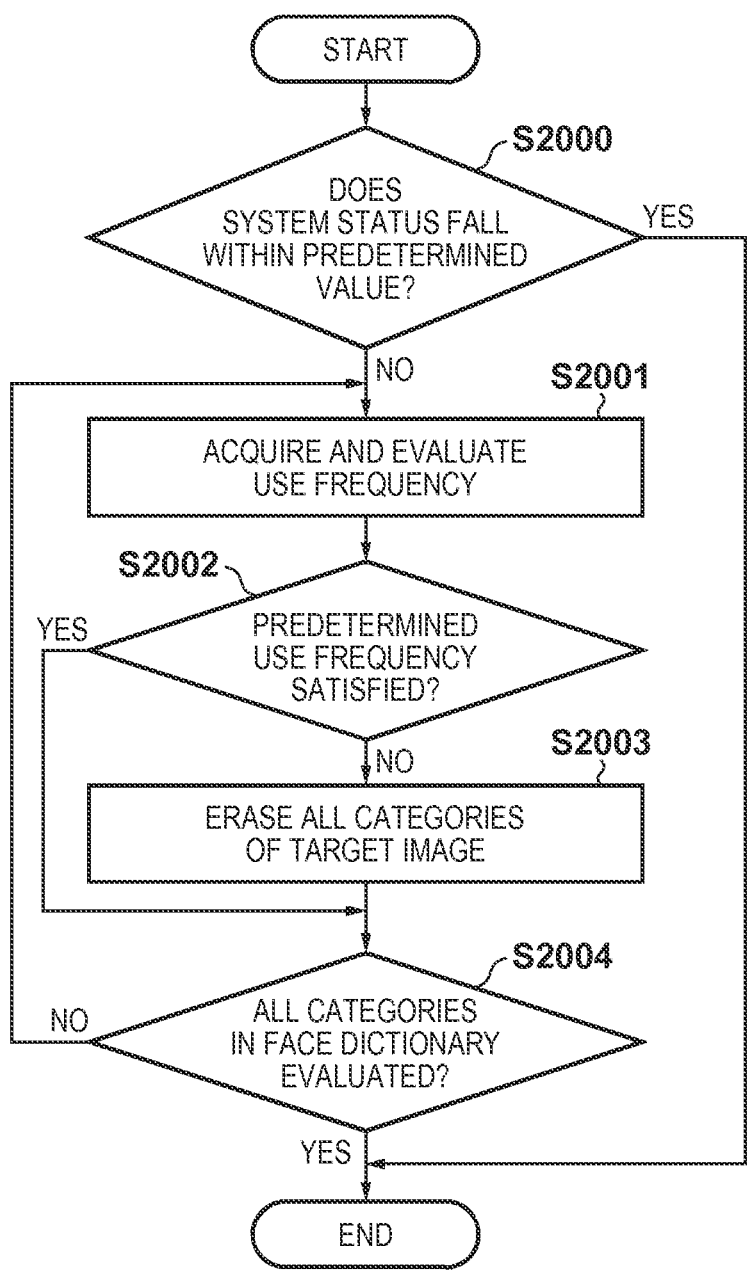

APPARATUS, IMAGE PROCESSING METHOD AND COMPUTER-READABLE STORAGE MEDIUM FOR OBJECT IDENTIFICATION BASED ON DICTIONARY INFORMATION

BACKGROUND OF THE INVENTION

Field of the Invention

The present invention relates to an image processing technique of detecting and managing an object in image data.

Description of the Related Art

As digital still cameras (to be also referred to as "DSCs" hereinafter) become popular, image data as many as several thousands or several ten thousands need to be handled nowadays. As one especially important technique for the handling method, personal recognition is implemented by handling images based on a person's face. For example, a face region included in an input image is detected in advance, information (to be referred to as a "feature amount" hereinafter) obtained by analyzing the detected face image is extracted, and the extracted feature amount is registered. Note that the feature amount to be registered increases in accordance with the number of images to be analyzed and the number of faces included in an image. A database in which a plurality of feature amounts are registered will be called a "dictionary" or "face dictionary". Personal recognition becomes possible by collating an obtained face dictionary with a feature amount obtained by analyzing a newly input image.

Japanese Patent No. 3469031 discloses an arrangement for evaluating and determining whether a face newly detected from an image should be registered in a face dictionary.

However, in Japanese Patent No. 3469031, incorrect determination may occur regardless of how to select a face to be registered in the face dictionary. The incorrect determination means a situation in which a person, who has already been recognized, is generated as a new different person as a result of recognition.

An example of the incorrect determination will be described in detail. When many images are scanned, many image feature amounts are registered in a dictionary. At this time, exceptional feature amounts are sometimes registered in the dictionary even for a family as a result of exceptional capturing. In such a case, a plurality of persons are generated even for the same person as identification results.

Also, in Japanese Patent No. 3469031, an object (for example, a passer irrelevant to the user) other than a target object may be registered in the face dictionary. A situation in which an object other than a target one is identified will be called "erroneous determination".

Repetition of incorrect determination and erroneous determination impairs the personal recognition accuracy based on the face dictionary.

SUMMARY OF THE INVENTION

The present invention provides an image processing technique of increasing the determination accuracy based on a dictionary used for object similarity determination.

To achieve the above object, an image processing apparatus according to the present invention comprises the following arrangement.

That is, an apparatus comprises: an extraction unit configured to extract feature information from an object of image data; a registration unit configured to register, in a dictionary, the feature information extracted by the extraction unit; and a similarity determination unit configured to refer to the dictionary and determine a similarity between feature information registered in the dictionary and the feature information extracted by the extraction unit, wherein, of feature information to be registered in the dictionary, feature information not satisfying a predetermined evaluation criterion is not used in determination by the similarity determination unit.

According to the present invention, the determination accuracy based on a dictionary used for object similarity determination can be increased.

Further features of the present invention will become apparent from the following description of exemplary embodiments (with reference to the attached drawings).

BRIEF DESCRIPTION OF THE DRAWINGS

FIG. 7 is a view showing the structure of a face feature amount;

FIG. 8 is a view showing a display example of an image group in a thumbnail format;

FIG. 9 is a view showing the structure of a face dictionary;

FIG. 12 is a view showing an example of a smoothing filter;

FIG. 18 is a view showing an example of the structure of a category;

FIG. 19 is a flowchart showing face dictionary customization procedures; and

FIG. 20 is a flowchart showing face dictionary customization procedures.

DESCRIPTION OF THE EMBODIMENTS

Embodiments of the present invention will now be described in detail with reference to the accompanying drawings.

<First Embodiment>

An embodiment of the present invention will be described to automatically generate a layout output by using an input image group. This merely exemplifies a form of implementation, and the present invention is not limited to the following practice.

The embodiment will exemplify the arrangement of a personal recognition module including a face dictionary, an arrangement for obtaining a personal recognition result, and a hardware arrangement in which the personal recognition module runs. Embodiments of the present invention are not limited to the following embodiments, and the personal recognition module in the embodiments can also be implemented in a DSC or printer having a similar hardware arrangement.

<Description of Hardware Arrangement>

Figure 1:
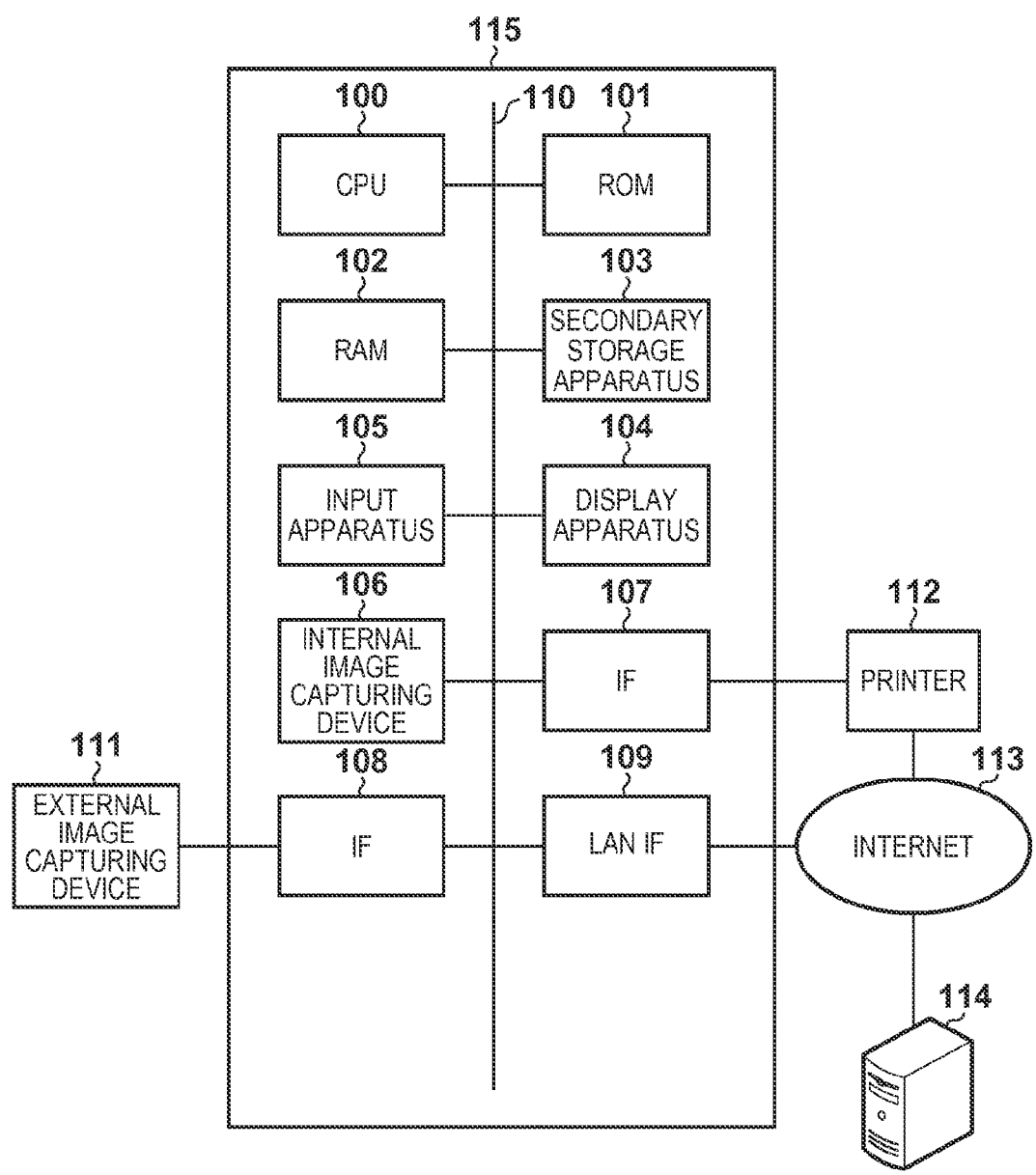
FIG. 1 is a block diagram showing the hardware arrangement of an image processing apparatus.

FIG. 1 is a block diagram showing an example of the hardware arrangement of an image processing apparatus according to the embodiment.

In FIG. 1, an image processing apparatus 115 is, for example, a computer. A CPU (Central Processing Unit) 100 executes information processing to be described in the embodiment in accordance with programs. The CPU 100 loads a program stored in a secondary storage device 103 and the like to a RAM 102 and runs the program on the RAM 102, thereby controlling of the entire image processing apparatus according to the present embodiment. A ROM 101 stores programs to be executed by the CPU 100. A RAM 102 provides a memory to temporarily store various kinds of information when the CPU 100 executes the programs. A secondary storage apparatus 103 such as a hard disk is a storage medium to save, for example, a database that saves image files and image analysis results. Not the ROM 101 but the secondary storage apparatus 103 may store programs for executing information processing to be described in the embodiment.

A display apparatus 104 is an apparatus which presents, to the user, various kinds of UIs (User Interfaces) to be described below, including a processing result in the embodiment. The display apparatus 104 is, for example, a display. The display apparatus 104 may have a touch panel function. A control bus/data bus 110 connects the above-described building elements to the CPU 100. The image processing apparatus 115 also includes an input apparatus 105 such as a mouse or keyboard used by a user to input an image correction processing instruction and the like.

The image processing apparatus 115 may include an internal image capturing device 106. An image captured by the internal image capturing device 106 undergoes predetermined image processing and is stored in the secondary storage apparatus 103. The image processing apparatus 115 may load image data from an external image capturing device 111 connected via an interface (an IF 108). The image processing apparatus 115 also includes a LAN (Local Area Network) IF 109. The LAN IF 109 may be wired or wireless. The LAN IF 109 is connected to Internet 113. The image processing apparatus 115 can also acquire an image from an external server 114 connected to the Internet 113.

A printer 112 for outputting an image and the like is connected to the image processing apparatus 115 via an IF 107. The printer 112 is further connected to the Internet 113 and can exchange print data via the LAN IF 109.

Figure 2:
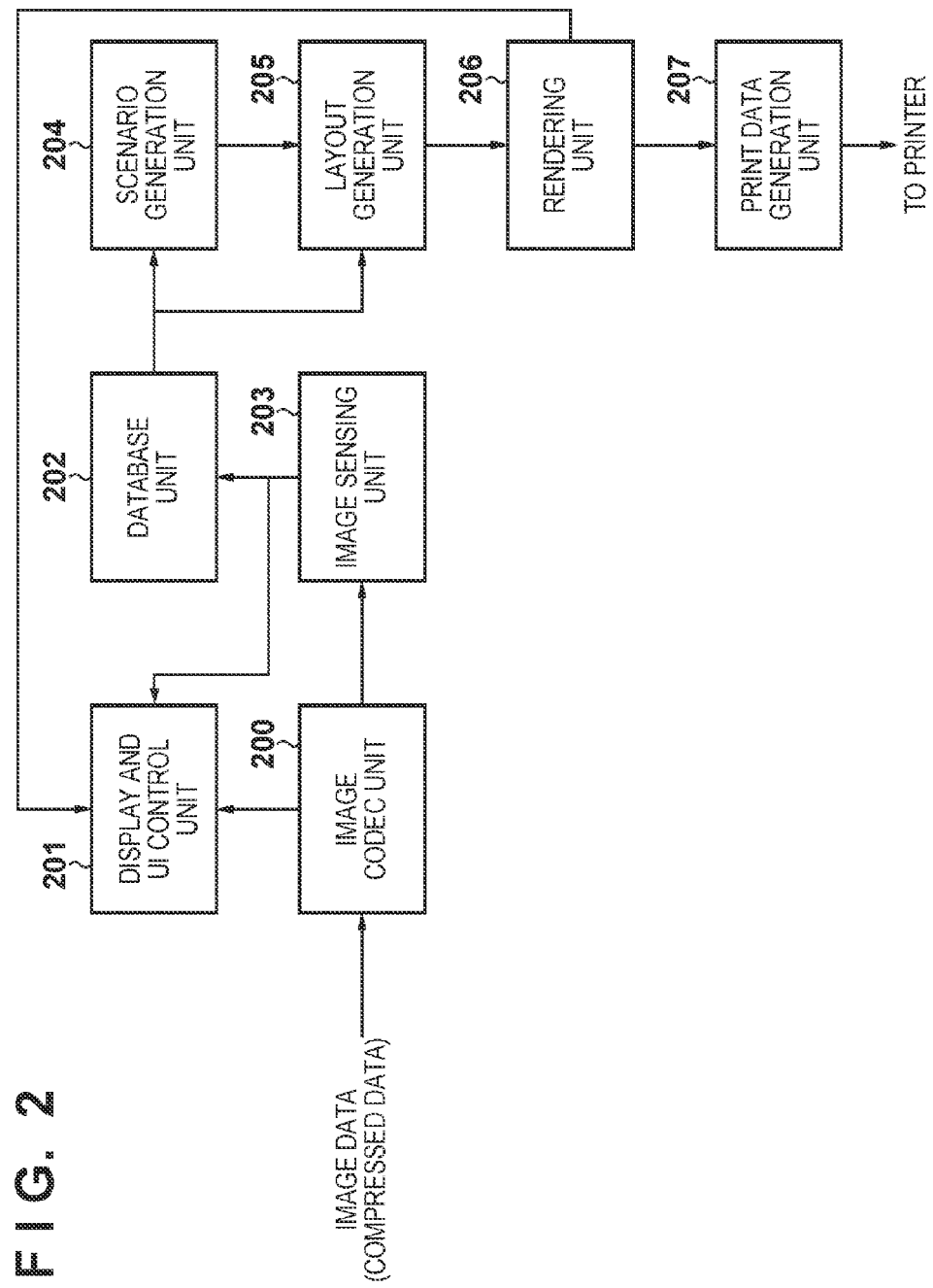
FIG. 2 is a block diagram showing software for controlling the image processing apparatus.

FIG. 2 is a block diagram showing a software arrangement including the above-described application according to the embodiment.

Image data acquired by the image processing apparatus 115 is normally compressed in a compression format such as JPEG (Joint Photography Expert Group). Hence, an image codec unit 200 decompresses image data based on the compression format and converts it into image data (bitmap data) in a so-called RGB dot-sequential bitmap data format. The converted bitmap data is transferred to a display and UI control unit 201 and displayed on the display apparatus 104 such as a display.

When image data acquired by the image processing apparatus 115 is image data requiring no decoding processing, the processing by the image codec unit 200 is unnecessary.

The bitmap data is further input to an image sensing unit 203 (application), and undergoes various analysis processes (details will be described later) by the image sensing unit 203. Various kinds of attribute information of the image obtained by the analysis processing are stored in the secondary storage apparatus 103 by a database unit 202 (application) in accordance with a predetermined format. Note that image analysis processing and sensing processing will be handled in the same sense.

A scenario generation unit 204 (application) generates the conditions of a layout to be automatically generated in accordance with various conditions input by the user. A layout generation unit 205 performs processing of automatically generating a layout for arranging image data in accordance with the generated scenario.

A rendering unit 206 renders the generated layout into bitmap data for display. The bitmap data serving as the rendering result is transmitted to the display and UI control unit 201, and its contents are displayed on the display apparatus 104. The rendering result is also transmitted to a print data generation unit 207, and the print data generation unit 207 converts it into printer command data and transmits the command to the printer 112.

Figure 3:
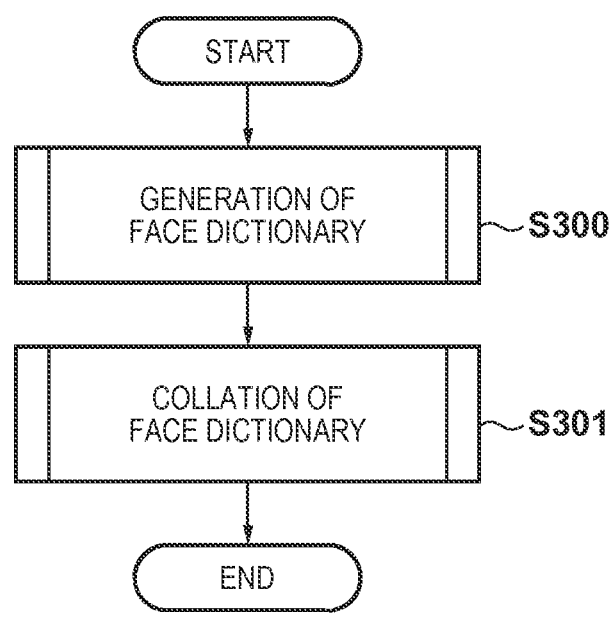
FIG. 3 is a flowchart showing personal recognition processing.

A personal recognition processing sequence will be explained with reference to FIG. 3.

In step S300, the image processing apparatus 115 generates a face dictionary for performing personal recognition by collating face images. The face dictionary generation method will be described later. In step S301, the image processing apparatus 115 recognizes the person of a face image by using the face dictionary generated in step S300 (face image collation). The recognizing method will be described later. In FIG. 3, the face dictionary generation step and face image collation step are described separately for convenience, but the execution of them is not limited to this. That is, collation may be performed while generating a face dictionary. A case in which face dictionary generation and face image collation are performed simultaneously will be explained.

Face dictionary generation step S300 will be described in detail with reference to FIG. 4.

In step S400, the image sensing unit 203 acquires an image data group. For example, the user connects, to the image processing apparatus 115, an image capturing apparatus or memory card which stores captured images, and loads the captured images from it, thereby acquiring an image data group. Images which have been captured by the internal image capturing device 106 and stored in the secondary storage apparatus 103 may be acquired. Image data may be acquired via the LAN 109 from an external apparatus other than the image processing apparatus 115, such as the external server 114 connected to the Internet 113.

Figure 5:
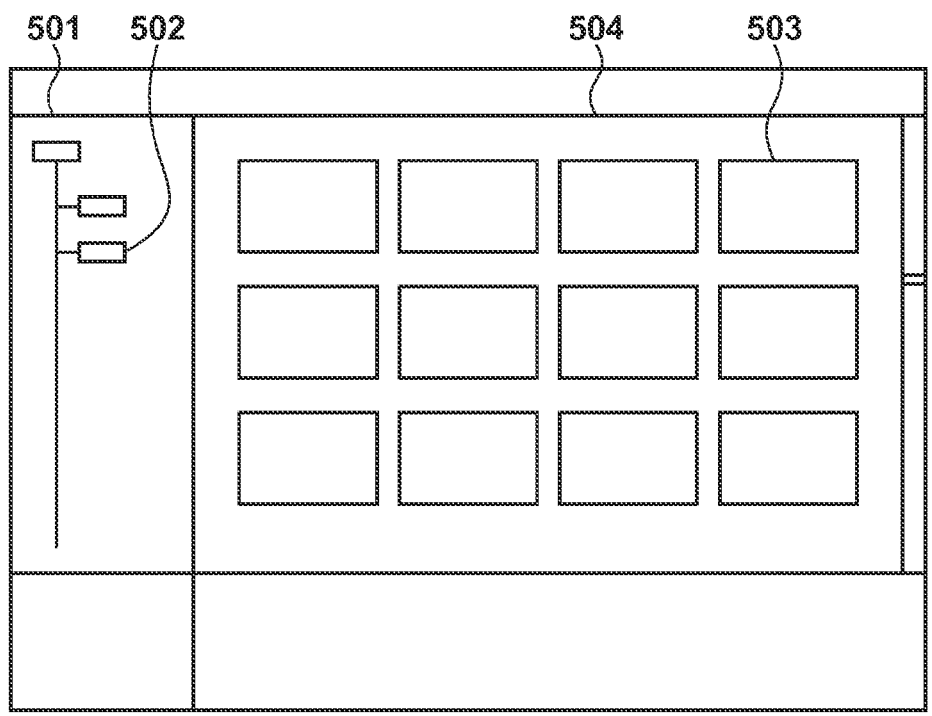
FIG. 5 is a view showing a display example of an image group in a thumbnail format.
Figure 6:
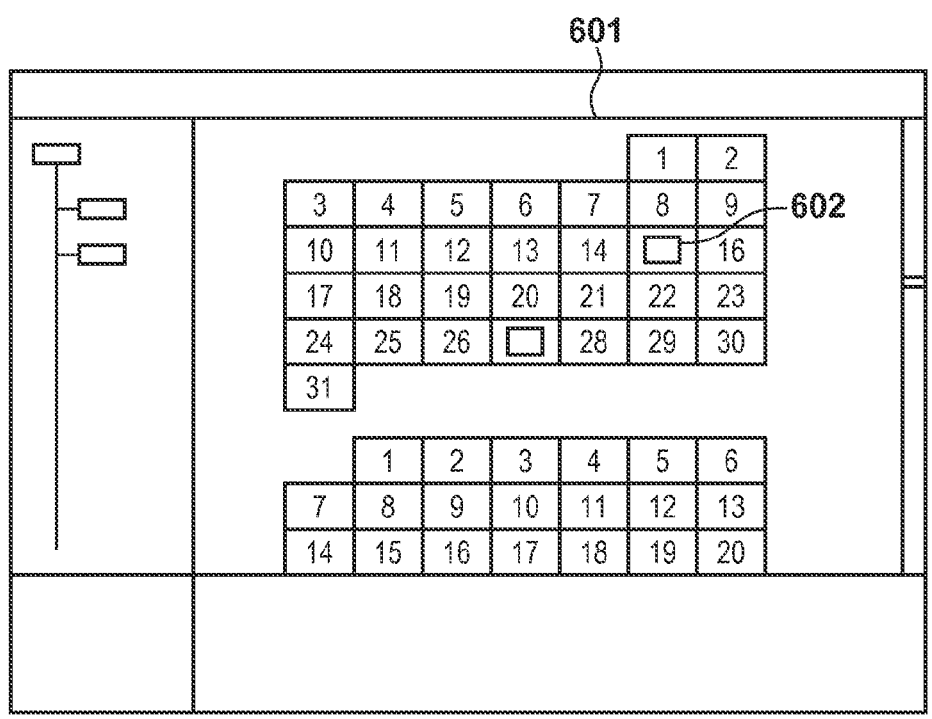
FIG. 6 is a view showing a display example of an image group in a calendar format.

After the image data group is acquired, it may be displayed on a UI, as shown in FIGS. 5 and 6. A display on the display apparatus 104 upon acquiring an image data group will be explained with reference to FIGS. 5 and 6. For example, in FIG. 5, folders in the secondary storage apparatus 103 are displayed in a tree-shaped structure in a folder window 501. If the user selects a folder 502, thumbnails 503 of images are displayed in a preview window 504. In FIG. 6, a calendar is displayed in a preview window 601. If the user clicks a date portion 602, images captured at the clicked date can be displayed in the preview window 601 in the same fashion as the thumbnails 503.

In step S401, the image sensing unit 203 acquires various characteristic information such as characteristic amounts including a face position in an image. Table 1 exemplifies characteristic amounts to be acquired and their information types.

TABLE 1

| Sensing Classification | Sensing Sub-classification | Data Type |
| --- | --- | --- |
| Basic Image Characteristic Amount | Average luminance | int |
| | Average saturation | int |
| | Average hue | int |
| Face Detection | Number of person's faces | int |
| | Coordinate position | int*8 |
| | Average Y in face region | int |
| | Average Cb in face region | int |
| | Average Cr in face region | int |
| Scene Analysis | Scene result | char |

First, the average luminance and average saturation of an entire image, which are basic characteristic amounts of an image (basic image characteristic amounts), are obtained by a known method. For example, the R, G, and B components of each pixel of an image are converted into known luminance and color difference components (for example, Y, Cb, and Cr components), and the average value of the Y components is calculated. For the average saturation, the Cb and Cr components are calculated for each pixel, and the average value S is calculated by solving equation (1):

$$S=\sqrt{Cb^2+Cr^2} \quad (1)$$

The average hue AveH in an image may be calculated as a characteristic amount to evaluate the tone of the image. The hues of respective pixels can be calculated using a known HIS transformation, and smoothed in the entire image, thereby calculating AveH. This characteristic amount need not be calculated for an entire image. For example, an image may be divided into regions having a predetermined size, and the characteristic amount may be calculated for each region.

Processing of detecting the face of a person serving as an object will be described next. Various methods are usable as the person's face detection method used in the embodiment. In a method described in Japanese Patent Laid-Open No. 2002-183731, first, an eye region is detected from an input image, and a region around the eye region is set as a face candidate region. The luminance gradient and the weight of the luminance gradient are calculated for the face candidate region. These values are compared with the gradient and gradient weight of a preset ideal reference face image. At this time, when the average angle between the gradients is equal to or smaller than a predetermined threshold, the input image is determined to have a face region.

In a method described in Japanese Patent Laid-Open No. 2003-30667, a flesh color region is detected from an image. A human iris color pixel is then detected in the flesh color region, thereby detecting the position of an eye.

In a method described in Japanese Patent Laid-Open No. 8-63597, the matching level between an image and each of a plurality of face shape templates is calculated. A template having a highest matching level is selected. If the highest matching level is equal to or more than a predetermined threshold, a region on the selected template is set as a face candidate region. By using this template, the position of an eye can be detected.

In a method described in Japanese Patent Laid-Open No. 2000-105829, a noise image pattern is set as a template. Then, an entire image or a designated region of an image is scanned. A position that matches the template most is output as the position of the nose. A region above the nose position in the image is assumed to be a region where the eyes exist. The eye existence region is scanned using an eye image pattern as a template, thereby obtaining a matching level. A set of pixels whose matching levels are higher than a given threshold is acquired as an eye existence candidate position. A continuous region included in the eye existence candidate position set is divided into clusters. The distance between each cluster and the nose position is calculated. A cluster having a shortest distance is decided as a cluster including an eye, thereby detecting the organ position.

As other methods of detecting a face and organ positions, known methods are usable, including methods described in Japanese Patent Laid-Open Nos. 8-77334, 2001-216515, 5-197793, 11-53525, 2000-132688, 2000-235648, and 11-250267, and Japanese Patent No. 2541688.

As a result of the processing, the number of person's faces in each input image data and the coordinate positions of each face can be acquired. Once the coordinate positions of the face (face region) in image data are known, the average Y, Cb, and Cr values of pixel values included in the face region can be calculated for each face region. In this manner, the average luminance and average color differences of the face region can be obtained. Further, scene analysis processing can be performed using the characteristic amount of an image. The scene analysis processing can use techniques disclosed in, for example, Japanese Patent Laid-Open Nos. 2010-251999 and 2010-273144 filed by the present applicant. As a result of the scene analysis processing, identifiers for discriminating capturing scenes such as Landscape, Nightscape, Portrait, Underexposure, and Others can be acquired.

Note that the sensing information is not limited to that acquired by the above-described sensing processing, and any other sensing information may be used. The sensing information acquired in the above-described manner is stored in the database unit 202. The save format in the database unit 202 is not particularly limited. For example, a structure as represented by Table 2 is described using a general-purpose format (for example, XML: eXtensible Markup Language) and stored.

TABLE 2

| First Layer | Second Layer | Third Layer | Contents |
| --- | --- | --- | --- |
| BaseInfo | ImageID | | Image identifier |
| | ImagePath | | File storage location |
| | ImageSizeWidthA | | Image size and width |
| | CaptureDateTime | | Capturing date & time |
| SenseInfo | AveY | | Average luminance of image |
| | AveS | | Average saturation of image |
| | AveH | | Average hue of image |
| | SenseType | Landscape Portrait . . . | Scene type |

TABLE 2-continued

| First Layer | Second Layer | Third Layer | Contents |
|---|---|---|---|
| | Person | FaceID | Identifier of detected face |
| | | Position | Position in image |
| | | AveY | Average luminance of face |
| | | AveCb | Average Cb of face |
| | | AveCr | Average Cr of face |
| UserInfo | FavoriteRate | | Favorite rate of image |
| | ViewingTimes | | Number of times of viewing |
| | PrintingTimes | | Number of times of printing |
| | Event | Travel | Theme of image capturing |
| | | Anniversary | |
| | | . . . | |

Table 2 represents an example in which pieces of attribute information of each image are classified into three categories and described. The first BaseInfo tag is information added to an acquired image file in advance and representing the image size and capturing time information. This tag includes the identifier <ImageID> of each image, the storage location <ImagePath> where the image file is stored, the image size <ImageSize>, and the capturing date & time <CaptureDateTime>.

The second SensInfo tag is used to store the result of the above-described image analysis processing. The average luminance <AveY>, average saturation <Ayes>, and average hue <AveH> of an entire image and the scene analysis result <SceneType> are stored. Information of a face detected in the image is described in a <Person> tag. Information about the face position <Position> and face colors <AveY>, <AveCb>, and <AveCr> of the person in the image can be described. A <FaceID> tag is an identifier (identifier for identifying the same object) which associates feature amounts extracted from the face image with an image file. The feature amounts extracted from the face image will be described later.

The third <UserInfo> tag can store information input by the user for each image. For example, <FavoriteInfo> describes the scale of "favorability" to be described later. <ViewingTimes> is the number of times of viewing by which the user opened and viewed the image. <PrintingTimes> is the number of times of printing by which the user printed. <Event> is information which can be added as an attribute of the image. These are merely examples, and the user can describe another kind of information. Note that the image attribute information database storage method is not limited to the above-described one. Also, the format is arbitrary.

In step S402, the image sensing unit 203 generates a normalized face image. The normalized face images are face images obtained by extracting face images existing in images with various sizes, orientations, and resolutions, and converting and cutting out them into faces having a predetermined size and orientation. The positions of organs such as an eye and mouth are important to perform personal recognition. Thus, the normalized face image can have a size enough to reliably recognize the organs. By preparing the normalized face images, feature amount extraction processing in next step S403 need not cope with faces of various resolutions.

In step S403, the image sensing unit 203 extracts face feature amounts from the normalized face image generated in step S402 (face feature amount extraction unit). The contents of the face feature amounts will be described in detail. The face feature amounts are vector quantities each obtained by extracting at least one piece of information unique to the face, such as an organ or outline. The face feature amounts are, for example, pieces of individual information such as the sizes of respective organs. The face feature amounts also include secondary information generated from pieces of individual information such as the ratio of the interval between both eyes to the outline. These pieces of information will be called feature amount elements. The face feature amounts serving as vector quantities formed from the feature amount elements are used to collate a face image in next step S404. For example, a structure as shown in FIG. 7 is prepared to record the extracted face feature amounts. FaceInfo is an area where the extracted face feature amounts are recorded. ImageID is an original image including the face whose face feature amounts have been extracted. FaceID, ReferenceCount, Activation, NameInfo, and Property will be described later.

In step S404, the image sensing unit 203 acquires a similarity by comparing the face feature amounts acquired in step S403 with face feature amounts registered in advance in the database unit 202 called a face dictionary (similarity determination unit).

The face dictionary will be described in detail. To perform personal recognition, there is proposed a method of comparing newly obtained face feature amounts with existing face feature amounts. A database which records the existing face feature amounts is called a face dictionary. The recorded face feature amounts need to be discriminated from other face feature amounts in the face dictionary. Therefore, at the time of registration in the face dictionary, the usage and identifier are added to the face feature amounts acquired in step S403. In the embodiment, FaceID is the identifier for identifying the face feature amounts. ReferenceCount, Activation, NameInfo, and Property indicate the usage of the face feature amounts. These elements will be explained when actually describing an example of use.

The face feature amounts to which the usage and identifier of the feature amounts are added will be called an entry and will be simply referred to as an "entry". FIG. 7 shows the entry. If there are a plurality of entries which are registered in the face dictionary and are to be compared, a plurality of similarities are calculated. A case in which an entry to be compared is not registered will be described later. In actual personal recognition, face feature amounts included in entries are compared.

The similarity used to compare face feature amounts will be explained. The face feature amount comparison method is not particularly limited, and a known method is usable. For example, in Japanese Patent Laid-Open No. 2003-187229, the distance between feature amount vectors is evaluated as the similarity by using reliability based on a statistical method. Japanese Patent Laid-Open No. 2006-227699 discloses a method of evaluating, as the similarity, a calculated distance between feature amount vectors, though the feature amount vector calculation method differs from that in the present invention. The method of evaluating the similarity between face feature amounts can be a known method, as described above. In any case, the similarity is obtained based on the comparison between face feature amounts.

Note that face feature amounts of the same types can be extracted from all images so that they can be compared. However, even if the vector dimensions do not completely coincide with each other, these face feature amounts may be evaluated by an operation of, for example, weighting obtained vector elements. A similarity exhibiting a smallest value is selected from the obtained similarities, and the process advances to step S405. At this time, a feature amount counter used to calculate the selected similarity is incremented by one. More specifically, the contents of ReferenceCount shown in FIG. 7 are updated. The counter update method is not particularly limited as long as the record is finally left in a face feature amount used in determination of personal recognition.

In step S405, the image sensing unit 203 evaluates the similarity acquired in step S404. If the similarity is higher than a set similarity (YES in step S405), the process advances to step S406. If the similarity is equal to or lower than the set similarity (NO in step S405), the process advances to step S407. If none of the face feature amounts to be compared is registered, the process advances to step S407.

The set similarity will be described. The set similarity is a threshold for evaluating a similarity obtained as a result of calculation. The threshold may be an internally permanent value. Alternatively, the user may input the threshold by operating a UI (not shown). The threshold may change in accordance with a learning states acquired from a user operation. That is, the threshold can be set in an arbitrary form.

In step S406, the image sensing unit 203 additionally registers, in an existing user group, face feature amounts determined to have a similarity higher than the existing one. Details of the user group will be explained in step S407.

In contrast, face feature amounts determined to have a similarity equal to or lower than the set one mean that the detected face image represents a new person. In step S407, the image sensing unit 203 registers these determined face feature amounts as a new user group.

The user group will be explained. Face images identified as face feature amounts having a high similarity are highly likely to represent the same person. Such images (objects) can be grouped and classified for each object, and displayed to the user. FIG. 8 exemplifies this display. A folder window 801 displays persons in a tree-shaped structure. If the user selects a person 802, a preview window 804 displays thumbnails 803 of images. To implement this user friendliness, the user group is introduced.

An example of a user group registration method will be explained. More specifically, NameInfo shown in FIG. 7 is used. If a person is determined as a new person, a new user group is created. More specifically, a new identifier identifiable by NameInfo is issued. The identifier will be explained. For example, assume that a person included in an image is similar to none of n persons registered in the past. In this case, "n+1" meaning the (n+1)th person is described in NameInfo. In this manner, a new user group is created.

To "register in existing user group" in step S406, the assigned identifier is described in the feature amount element NameInfo among the target face feature amounts. Note that the user group registration method is not limited to this, and for example, the user may directly designate a character string. Alternatively, a table which associates NameInfo with a character string designated by the user may be prepared separately.

By registering the user group, images having the same NameInfo can be grouped and listed. In the embodiment, the system automatically issues the initial value of NameInfo. After that, the user can give a name, as needed. The name is a name designated by the user for the person 802 in FIG. 8.

The correspondence between the name designated by the user and the user group may be managed in another table. NameInfo can also be directly rewritten.

In step S408, the image sensing unit 203 registers, in the face dictionary, the entry including the face feature amounts extracted in step S403. In this way, the entry (for each identifier) in the face dictionary is added. FIG. 9 schematically shows the face dictionary generated by registering a plurality of face feature amounts. The entry can be created by additionally writing it in the above-described face dictionary.

In step S409, the image sensing unit 203 evaluates another person image in image data. If there is another image to be processed (YES in step S409), the process returns to step S401. If there is no image to be processed (NO in step S409), the process advances to step S410. In step S410, the image sensing unit 203 determines whether all image data in the folder have been processed. If all image data have not been processed (NO in step S410), the process returns to step S400. If all image data have been processed (YES in step S410), the process ends. Accordingly, personal recognition of a person is executed simultaneously when a face dictionary is generated.

Figure 10:
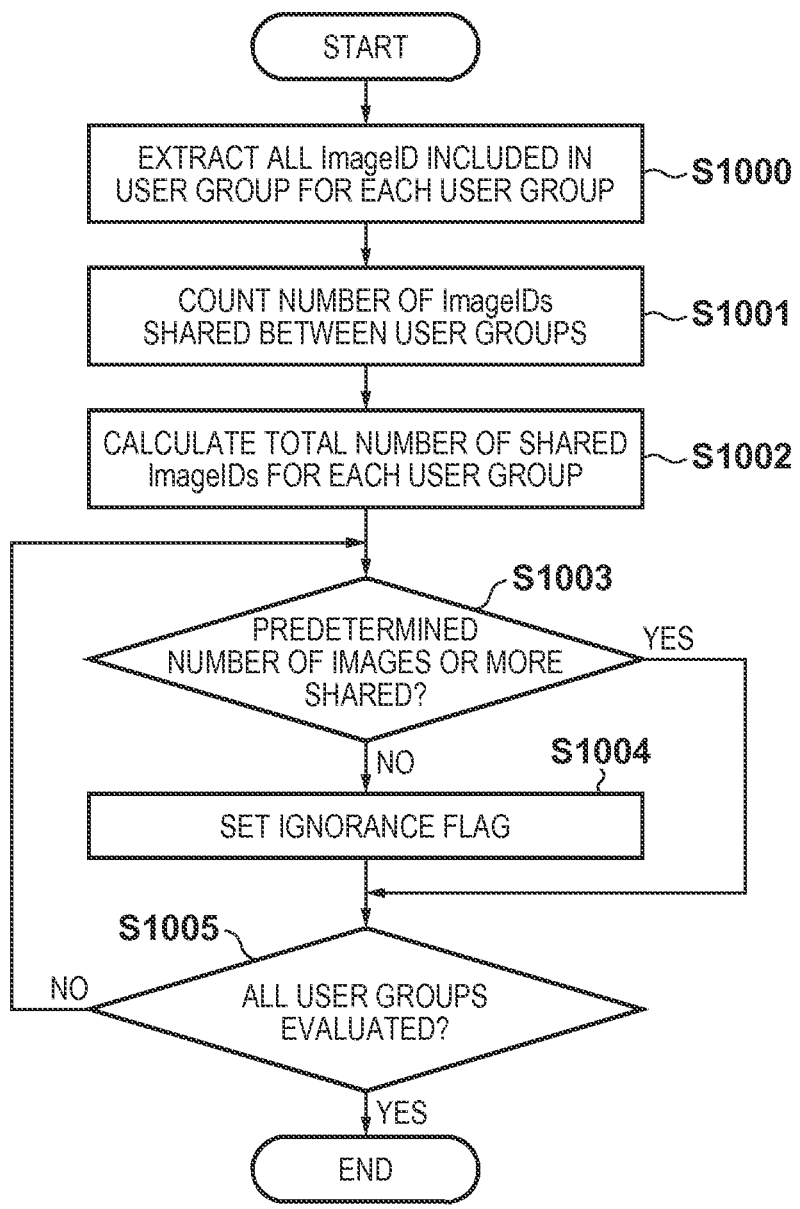
FIG. 10 is a flowchart showing face dictionary customization procedures according to the first embodiment.

Next, a method of customizing the thus-generated face dictionary will be explained. FIG. 10 is a flowchart showing face dictionary customization procedures.

In step S1000, for each user group, the image sensing unit 203 extracts ImageID included in the user group. Table 3 exemplifies the extraction results. Table 3 lists ImageIDs included for each user group identified by NameInfo.

TABLE 3

| NameInfo | ImageID | | | | | | | |
|---|---|---|---|---|---|---|---|---|
| 0 | 0 | 1 | 2 | 3 | 4 | 5 | 6 | 7 |
| 1 | 0 | 3 | 4 | 7 | 8 | 9 | | |
| 2 | 1 | 4 | 5 | 8 | 9 | 10 | | |
| 3 | 1 | 2 | 3 | 5 | 8 | | | |
| 4 | 11 | | | | | | | |

For example, a user group identified by NameInfo=0 includes ImageID=0, 1, 2, 3, 4, 5, 6, 7. A user group identified by NameInfo=1 includes ImaeID=0, 3, 4, 7, 8, 9.

In step S1001, the image sensing unit 203 counts the number of ImageIDs shared between different user groups. For example, ImageID=0, 3, 4, 7 are shared between the user group identified by NameInfo=0 and the user group identified by NameInfo=1. In other words, NameInfo=0 and NameInfo=1 recognized as different persons simultaneously exist (are captured) in images of ImageID=0, 3, 4, 7. This reveals that the number of images shared between NameInfo=0 and NameInfo=1 is four. The number of shared images will be called "sharing level". An example of the expression is "the sharing level between NameInfo=0 and NameInfo=1 is four". Similarly, sharing levels between all different user groups are checked. For each user group, sharing levels with other user groups are counted. Table 4 exemplifies sharing levels counted between all user groups.

TABLE 4

| NameInfo | 0 | 1 | 2 | 3 | 4 | Total |
|---|---|---|---|---|---|---|
| 0 | | 4 | 3 | 4 | 0 | 11 |
| 1 | 4 | | 3 | 2 | 0 | 5 |
| 2 | 3 | 3 | | 3 | 0 | 6 |
| 3 | 4 | 2 | 3 | | 0 | 5 |

TABLE 4-continued

| NameInfo | 0 | 1 | 2 | 3 | 4 | Total |
|---|---|---|---|---|---|---|
| 4 | 0 | 0 | 0 | 0 | | 0 |

In step S1002, the image sensing unit 203 calculates the sum of sharing levels counted for each user group. The rightmost column of Table 4 shows the sum of sharing levels.

In step S1003, the image sensing unit 203 evaluates the sum of sharing levels calculated in step S1002. In this case, the sum of sharing levels is compared with a predetermined threshold, and it is determined whether the user group shares a predetermined number (threshold) or more of images. If it is determined that the sum is equal to or smaller than the predetermined threshold (NO in step S1003), the process advances to step S1004. If it is determined that the sum is larger than the predetermined threshold (YES in step S1003), the process advances to step S1005. The threshold may be set in advance or set by the user.

In step S1004, the image sensing unit 203 regards all face feature amounts forming the user group as unnecessary face feature amounts. At this time, the image sensing unit 203 sets a flag (ignorance flag (use inhibition flag)) not to use these face feature amounts at the time of sensing. More specifically, the flag is set in Activation of FIG. 7. For example, it is defined that the sum of sharing levels has reached a predetermined use frequency when Activation is "0", and has not reached it when Activation is "1". The initial value of Activation is set to "0". If the acquired sum of sharing levels has reached the predetermined threshold, Activation remains the initial value. In the use of the face dictionary, it can be inhibited to refer to the entry of a user group which does not share a predetermined number or more of images.

In step S1005, the image sensing unit 203 determines whether the sum of sharing levels has been evaluated for all user groups. If the sum of sharing levels has not been evaluated for all user groups (NO in step S1005), the process returns to step S1003. If the sum of sharing levels has been evaluated for all user groups (YES in step S1005), the process ends.

In the embodiment, the sharing level between user groups is employed as only one evaluation scale to determine whether to use an entry when using the face dictionary. However, the number of evaluation scales is not limited to one. For example, a case in which the number of image data is small at the initial stage of face dictionary generation will be explained. At this time, if the face dictionary is customized using only the sharing level between user groups as the evaluation scale, reference of all registered face feature amounts is always inhibited depending on the predetermined threshold. To prevent this situation, the ratio of the total number of images belonging to a user group to the number of images shared between different user groups may be used as an evaluation scale to determine whether to use an entry when using the face dictionary. That is, this ratio is used as the second evaluation scale, and if the number of shared images is equal to or larger than a predetermined ratio, the evaluation in step S1003 can be skipped.

By the above-described processing, the customization of the face dictionary ends. An entry determined not to be referred to will not be used, and the accuracy of the face dictionary can be increased.

As described above, according to the first embodiment, when using the face dictionary, whether to use an entry is determined in accordance with the sharing level of images between user groups. More specifically, if the sharing level between user groups is equal to or lower than a predetermined criterion, an entry is not used in the use of the face dictionary. Hence, the use of an entry registered by incorrect determination or erroneous determination among entries registered in the face dictionary can be prevented. This can increase the recognition accuracy of the face dictionary.

<Second Embodiment>

The second embodiment will explain another form of face dictionary customization in the first embodiment. The hardware arrangement, the software arrangement, and generation of the face dictionary are the same as those in the first embodiment, and a description thereof will not be repeated.

An outline of processing in the second embodiment will be described. A person of high interest as an object is often in focus. It is therefore determined to register the face image of an in-focus object as a face feature amount in the face dictionary. To the contrary, a person of less interest as an object is often out of focus. Further, an out-of-focus image of even an object of high interest cannot represent the feature of the object correctly. Hence, it is determined not to register an out-of-focus image in the face dictionary.

A method of evaluating a focusing level will be described. The method of evaluating a focusing level is not particularly limited. For example, there is a method of intentionally smoothing a target image and evaluating a change of a pixel before and after smoothing. If the target image is in focus, the change of the pixel upon smoothing is expected to be large. If the target image is out of focus, the change upon smoothing is expected to be small. The focusing level is evaluated based on the difference in expected change amount. This method will be described in detail with reference to FIG. 11.

Figure 11:
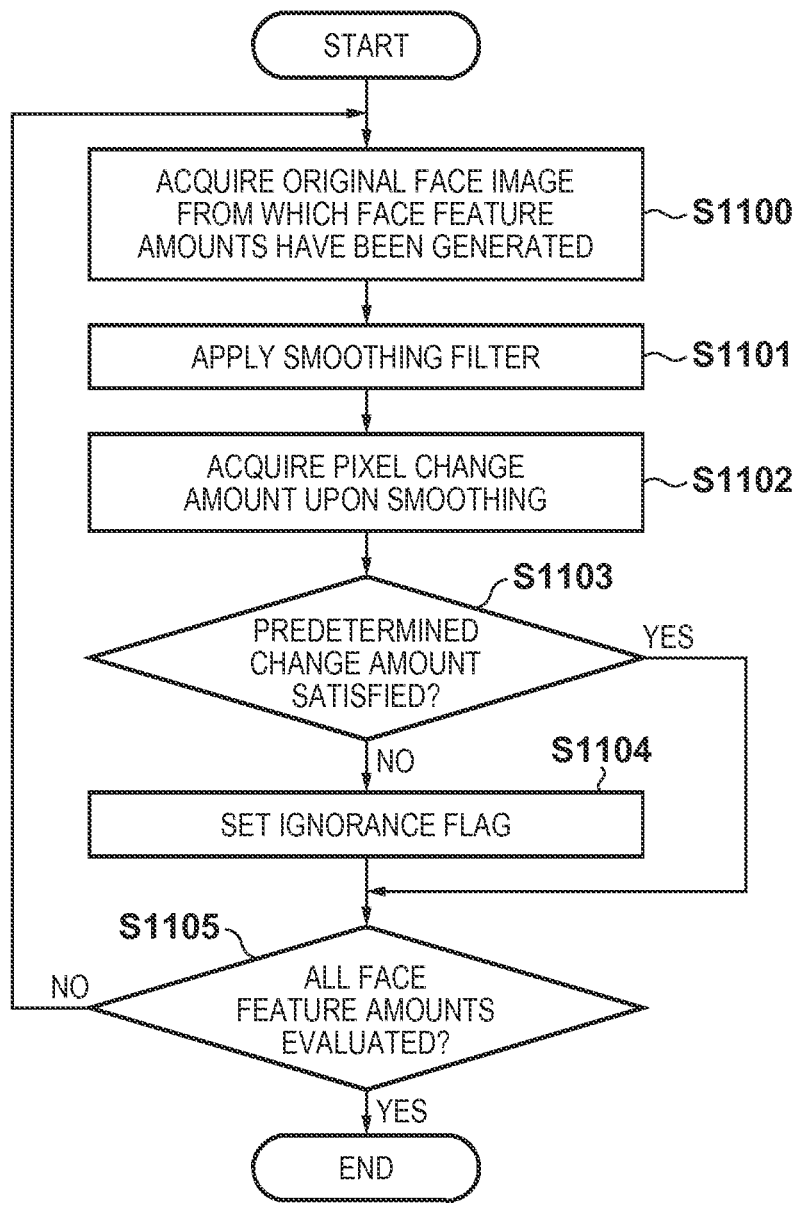
FIG. 11 is a flowchart showing face dictionary customization procedures according to the second embodiment.

FIG. 11 is a flowchart showing face dictionary customization procedures according to the second embodiment.

In step S1100, an image sensing unit 203 acquires an original face image from which face feature amounts have been extracted. At this time, the resolution of a face image to be acquired is arbitrary. The resolution of the original image may be unchanged or changed. In any case, it suffices to acquire an image in which the face region is trimmed. For example, coordinate positions are acquired from structured/ described image sensing information. At this time, the resolution of the face image to be acquired can also be acquired.

Figure 12:
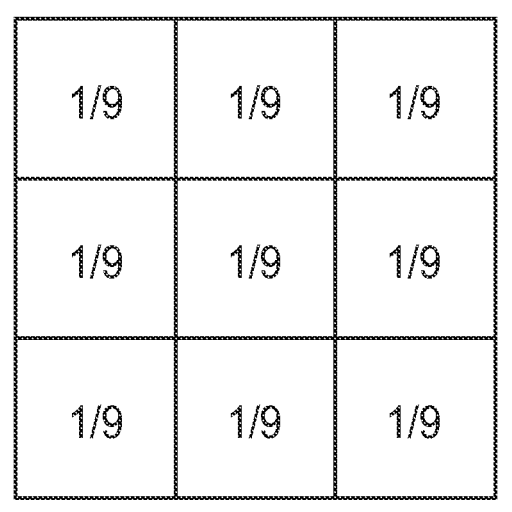

In step S1101, the image sensing unit 203 applies a smoothing filter to the trimmed image acquired in step S1100. FIG. 12 shows an example of the smoothing filter used to smooth an image in terms of the spatial frequency of the image. The sharpness of the original image can be reduced by applying the smoothing filter to the trimmed image.

In step S1102, the image sensing unit 203 acquires the change amount of a pixel upon smoothing from images before and after applying the smoothing filter in step S1101. More specifically, the absolute value of the difference between signal values of the pixel that indicate the same coordinates in images before and after smoothing is calculated, and the sum is calculated for all pixels. As a result, the change amount used to measure the degree of change in the entire region of the acquired face image is obtained.

In step S1103, the image sensing unit 203 evaluates the obtained change amount. If the change amount is equal to or larger than a predetermined threshold (YES in step S1103), it is determined that the original image has a satisfactory sharpness (sharpness is equal to or higher than the threshold). In this case, the process advances to step S1105 without changing the face feature amounts. In contrast, if the change amount is smaller than the predetermined threshold (NO in step S1103), it is determined that the original image does not have a satisfactory sharpness, and the process advances to step S1104.

In step S1104, the image sensing unit 203 sets a flag (ignorance flag) to ignore the target face feature amounts. It suffices to set the flag in Activation, similar to the first embodiment.

In step S1105, the image sensing unit 203 determines whether all face feature amounts have been evaluated. If there is an undetermined face feature amount (NO in step S1105), the process returns to step S1100. If there is no undetermined face feature amount (YES in step S1105), the process ends.

As described above, according to the second embodiment, an image whose improper face feature amounts have been registered in the face dictionary is specified in terms of the spatial frequency. If it is determined that the face feature amounts are improper, the use of them is restricted, thereby increasing the recognition accuracy of the face dictionary.

<Third Embodiment>

The third embodiment will exemplify the timing to customize the face dictionary. The hardware arrangement, the software arrangement, and generation of the face dictionary are the same as those in the first embodiment, and a description thereof will not be repeated.

The timing to customize the face dictionary is not particularly limited. This timing will be explained by exemplifying a case in which the face dictionary is generated for the first time.

Figure 13:
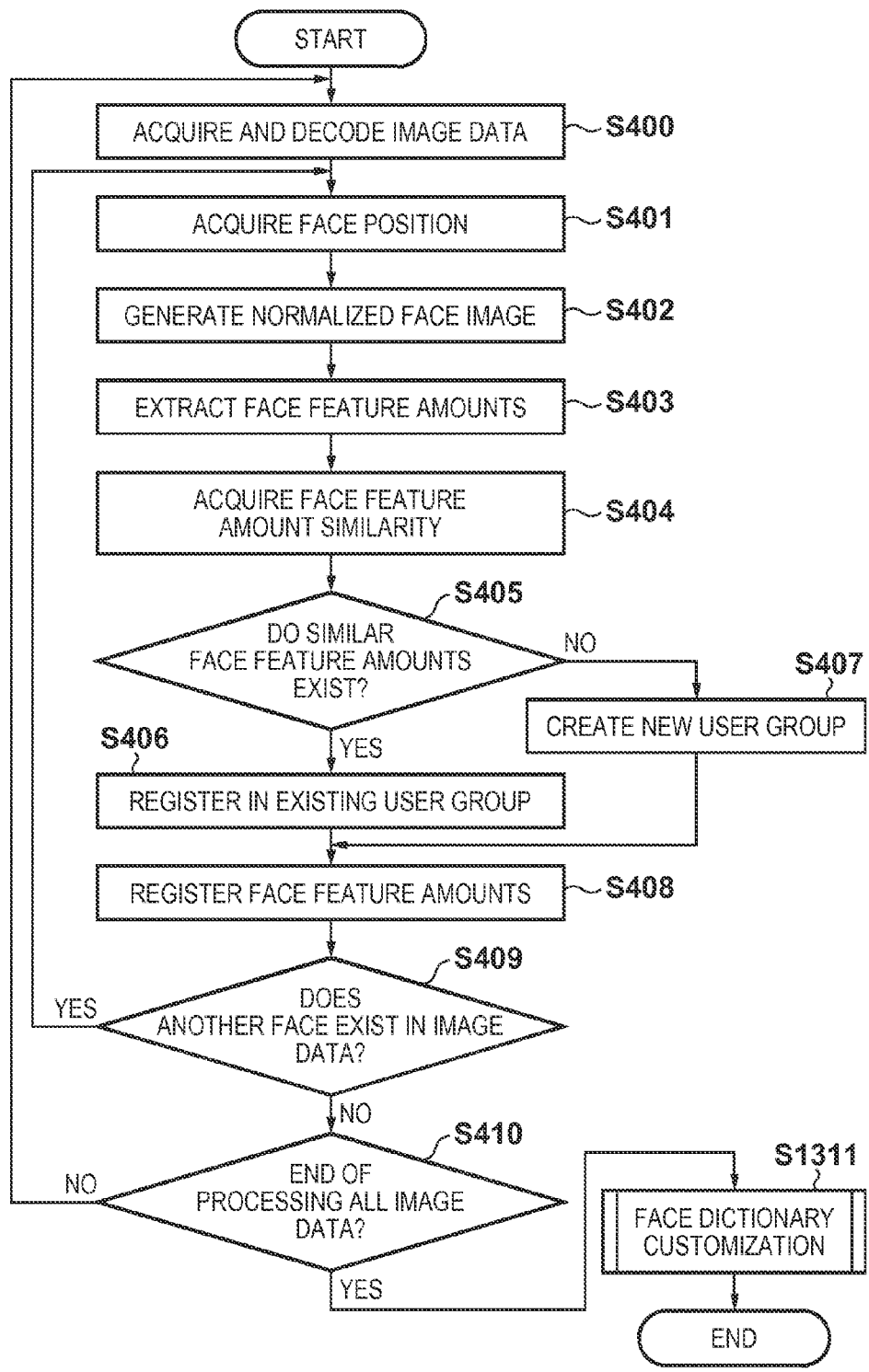
FIG. 13 is a flowchart showing personal recognition processing including face dictionary customization according to the third embodiment.

FIG. 13 is a flowchart showing personal recognition processing including face dictionary customization. When generating a face dictionary for the first time, an image sensing unit 203 executes face dictionary customization in step S1311, as shown in FIG. 13, after step S410 of the flowchart of FIG. 4 in the first embodiment. As a result, face feature amounts which are erroneously registered in initial registration of the face dictionary can be excluded. Step S1311 is, for example, processing described with reference to FIG. 10 or 11. This processing may be executed before step S400 as part of initialization when newly reading a folder unless the face dictionary is generated for the first time. Customization can also be executed if a predetermined condition is satisfied.

Figure 14:
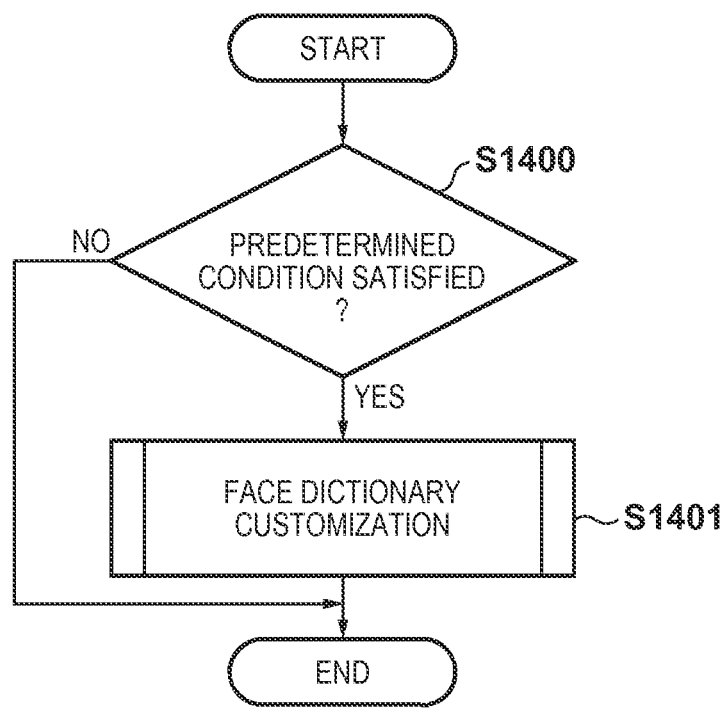
FIG. 14 is a flowchart showing execution of face dictionary customization according to the third embodiment.

Next, another example of execution trigger generation will be explained. FIG. 14 is a flowchart showing a state in which customization is executed when a predetermined condition is satisfied.

In step S1400, the image sensing unit 203 determines whether the usage of the face dictionary satisfies a predetermined condition. The predetermined condition is not particularly limited and is, for example, whether the use time has exceeded a predetermined time. In the embodiment, it is determined whether the time (use time) elapsed after customization was executed last time has exceeded a predetermined time. This information is not stored as a characteristic amount or face feature amount, but can be stored as part of system control in a secondary storage apparatus 103. At the same time, a threshold to determine whether to execute customization is also recorded. Whether the predetermined condition is satisfied is determined by evaluating these two amounts.

If it is determined that the predetermined condition is not satisfied (NO in step S1400), the process ends. If the predetermined condition is satisfied (YES in step S1400), the process advances to step S1401. Step S1401 is processing described with reference to FIG. 10 or 11.

An example of the predetermined condition is whether the number of images has exceeded a predetermined value. That is, customization of the face dictionary is executed when the number of images read after customization was executed last time exceeds the predetermined value. In this case, the number of images read after executing customization of the face dictionary is recorded. Another example of the predetermined condition is whether the number of face feature amounts has exceeded a predetermined value. That is, customization of the face dictionary is executed when the number of face feature amounts registered in the face dictionary after customization was executed last time exceeds the predetermined value. In this case, the number of face feature amounts registered in the face dictionary is recorded.

Further, customization can be executed based on an instruction from the user. In this case, software is instructed to execute customization via a dedicated UI (not shown). The customization need not always be executed quickly in response to an instruction from the user. For example, it is also possible to temporarily store the instruction from the user in the RAM and process it at the end of the program.

As described above, according to the third embodiment, the face dictionary can be customized (for example, the ignorance flag can be set) at an appropriate timing, in addition to the effects described in the above embodiments.

<Fourth Embodiment>

The fourth embodiment will exemplify a case in which an evaluation index (evaluation criterion) different from the sharing level in the first embodiment is employed. The hardware arrangement, the software arrangement, and generation of the face dictionary are the same as those in the first embodiment, and a description thereof will not be repeated.

Figure 15:
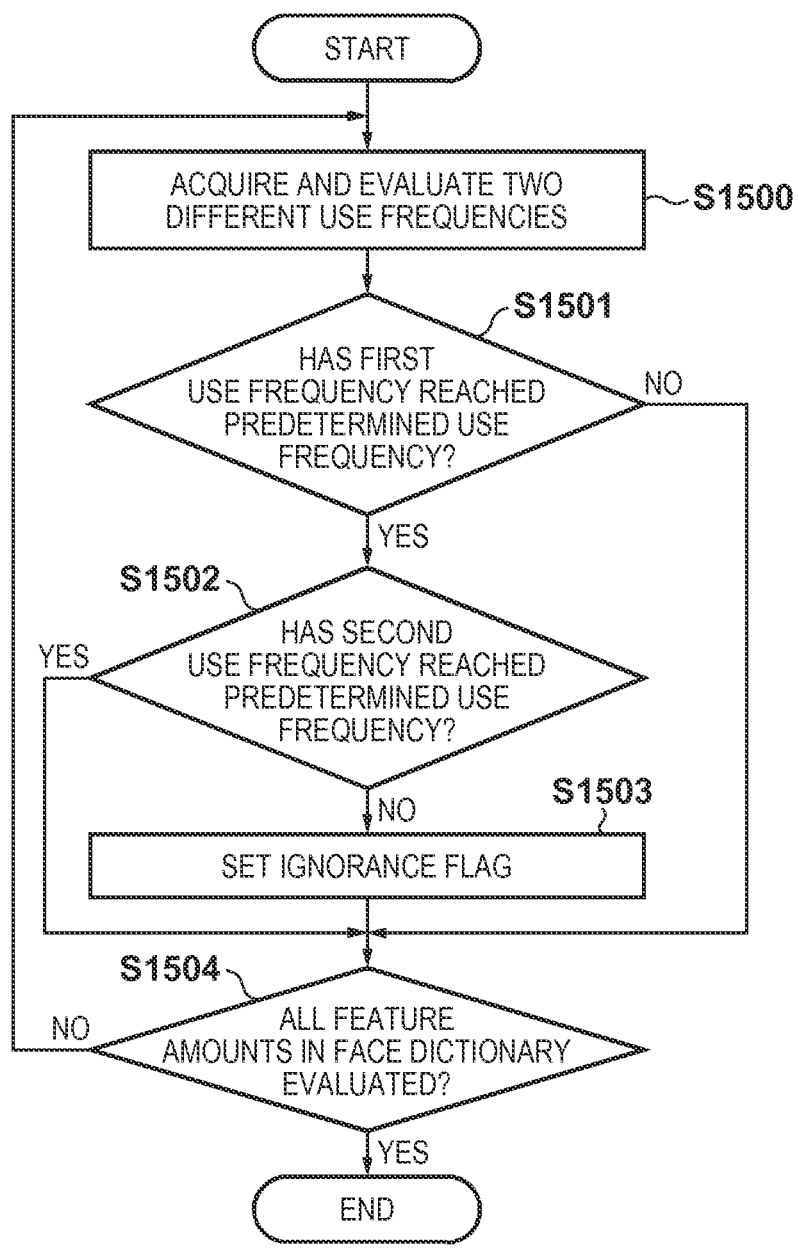
FIG. 15 is a flowchart showing face dictionary customization procedures according to the fourth embodiment.

FIG. 15 is a flowchart showing face dictionary customization procedures according to the fourth embodiment.

In step S1500, an image sensing unit 203 acquires two different use frequencies from use frequencies included in entries registered in the face dictionary. The use frequency will be explained here. Examples of the use frequencies of face feature amounts registered in the face dictionary are the number of times (number of times of use) by which the face feature amounts have actually been used for personal recognition, the time elapsed after they were used last time, and the time elapsed after they were registered for the first time. Information of these use frequencies is described in Property of FIG. 7. Table 5 exemplifies use frequencies used in the embodiment.

TABLE 5

| | |
|---|---|
| ReferenceCount | Number of faces identified using this entry for personal recognition |
| LastAccess | Date & time when this entry was used last time |
| AccessInterval | Time elapsed after this entry was used last time |
| Preference | Sum of favorability evaluation values associated with image |

The use frequencies may be selected after acquiring the overall entry, or only the use frequencies may be acquired.

In step S1501, the image sensing unit 203 determines whether the first one of the acquired use frequencies has reached a predetermined use frequency. In the embodiment, AccessInterval is used as the first one of the acquired use frequencies. In this case, the evaluation index used in step S1501 is the time (non-use time) elapsed after the face feature amounts were used last time for personal recognition. The predetermined use frequency can be designated in advance in the program. As another method, a threshold can be set from a UI (not shown). In any case, it is only necessary to prepare a threshold for evaluating acquired AccessInterval. If the acquired AccessInterval is equal to or shorter than a predetermined elapsed time (NO in step S1501), the process advances to step S1504. If the acquired AccessInterval is longer than the predetermined elapsed time (YES in step S1501), the process advances to step S1502.

In step S1502, the image sensing unit 203 determines whether the second one of the acquired use frequencies has reached a predetermined use frequency. In the embodiment, the second one of the acquired use frequencies is ReferenceCount. In this case, the evaluation index used in step S1502 is the number of times by which the face feature amount has been used for personal recognition. The predetermined use frequency can be designated in advance in the program. As another method, a threshold can be set from a UI (not shown). In any case, it suffices to prepare a threshold for evaluating acquired ReferenceCount.

If the acquired ReferenceCount has not reached the predetermined use frequency (NO in step S1502), the process advances to step S1503. In step S1503, the image sensing unit 203 sets a flag not to use the face feature amounts at the time of sensing. More specifically, the flag is described in Activation of FIG. 7. If the acquired ReferenceCount has reached the predetermined use frequency (YES in step S1502), the process advances to step S1504.

In step S1504, the image sensing unit 203 determines whether all entries in the face dictionary have been evaluated. If there is an undetermined entry (NO in step S1504), the process returns to step S1500. If all entries have been determined (YES in step S1504), the process ends. In this way, the face dictionary can be customized.

The embodiment employs AccessInterval and ReferenceCount as the use frequencies of an entry to be used for customization of the face dictionary. However, the use frequencies used to evaluate face feature amounts included in an entry are not limited to this pair of two use frequencies, and may be appropriately selected in accordance with, for example, the user's taste.

Figure 16:
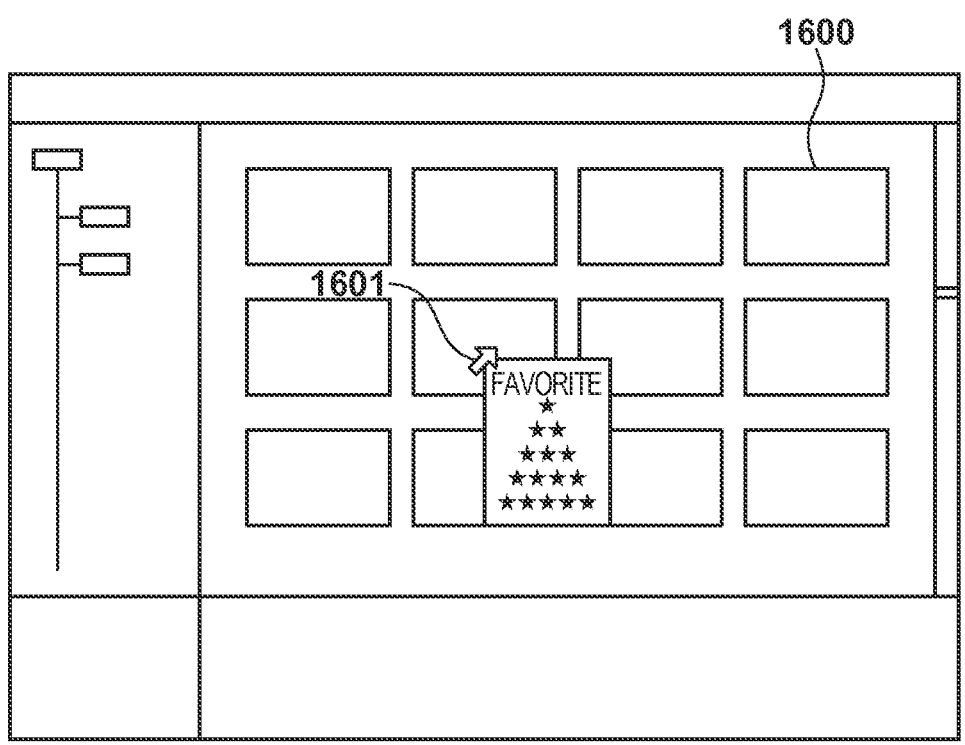
FIG. 16 is a view showing an example of a UI used to manually input the favorite rate.

A case in which FavoriteRate is used as the use frequency of an entry to be used for customization of the face dictionary will be explained. The evaluation index used in this case is "favorability" set by the user from a UI. First, the user selects a thumbnail image 1600 he wants on a UI as shown in FIG. 16 by using a mouse pointer 1601. Then, the user right-clicks to display a dialog capable of inputting the favorite rate. The user can select the number of ★s in the menu in accordance with his favorability. In general, it is set to increase the number of ★s as "favorability" is higher. In this manner, the user can add "favorability" to an image he likes. By FaceID, the designated "favorability" can be reflected in an entry associated with the image.

More specifically, Preference in Table 5 is acquired from Property of FIG. 7. Preference will be explained. Preference is an evaluation index which reflects "favorability" given to a plurality of images associated with the entry. For example, Preference can be the total number of ★s of "favorability" associated with the entry. As another case, the ratio of the number of ★s to the number of associated images may be calculated. Alternatively, Preference itself may be divided into five levels to designate a level for every total number of ★s. It suffices to reflect the "favorability" of an image in the entry.

At this time, the evaluation index used in step S1501 or S1502 is Preference of the entry. Even when this evaluation index is used, a predetermined use frequency can be designated in advance in the program. As another method, a threshold can be set from a UI (not shown). In any case, it is only necessary to prepare a threshold for evaluating acquired Preference.

As another use frequency used as an evaluation index in step S1501 or S1502, the time elapsed after the entry was registered for the first time can be used. Alternatively, the number of times by which an image associated with the entry has been printed can be recorded in the entry, like Preference. The number of times by which an image associated with the entry has been enlarged and displayed in a preview window (FIG. 8 or the like) may be recorded in the entry. Further, the number of accesses of the file of an image associated with the entry may be counted and recorded in the entry.

Note that the embodiment adopts two use frequencies of face feature amounts used to customize the face dictionary. However, the use frequencies used to evaluate face feature amounts are not limited to two. For a finer condition determination, three or more use frequencies are also available. Alternatively, only one use frequency is usable for simplicity.

As described above, according to the fourth embodiment, the use of an entry having a low use frequency is excluded, thereby increasing the recognition accuracy of the face dictionary. Since the face dictionary is customized in accordance with the use frequency of each entry of the face dictionary, a face dictionary considering the record of use by the user can be built.

<Fifth Embodiment>

The fifth embodiment will exemplify a modification of generation and usage of the face dictionary in the first embodiment. The hardware arrangement, the software arrangement, and generation of the face dictionary are the same as those in the first embodiment, and a description thereof will not be repeated.

Face dictionary generation step S300 will be described in detail with reference to FIG. 17.

Figure 4:
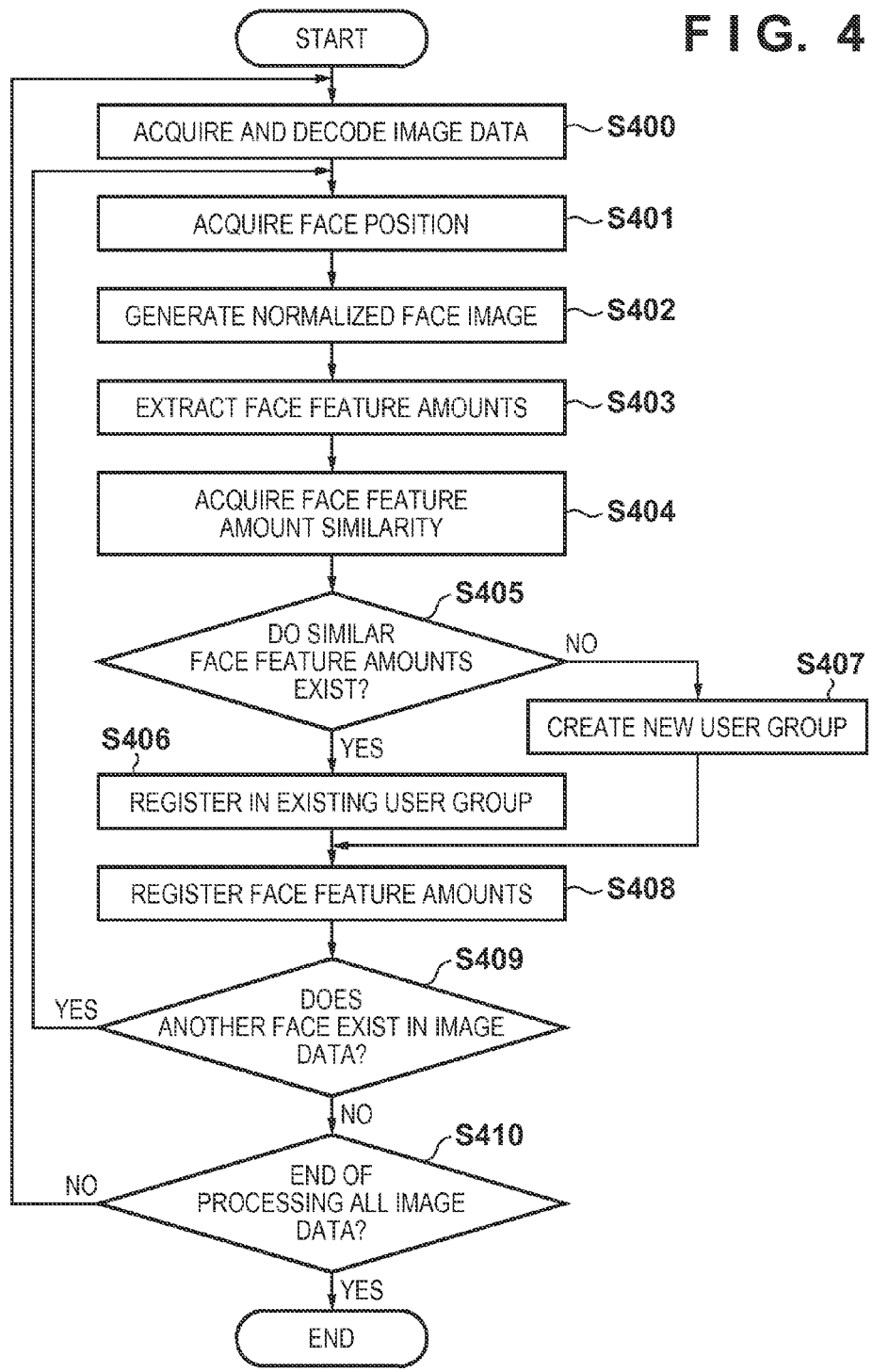
FIG. 4 is a flowchart showing details of face dictionary generation.
Figure 17:
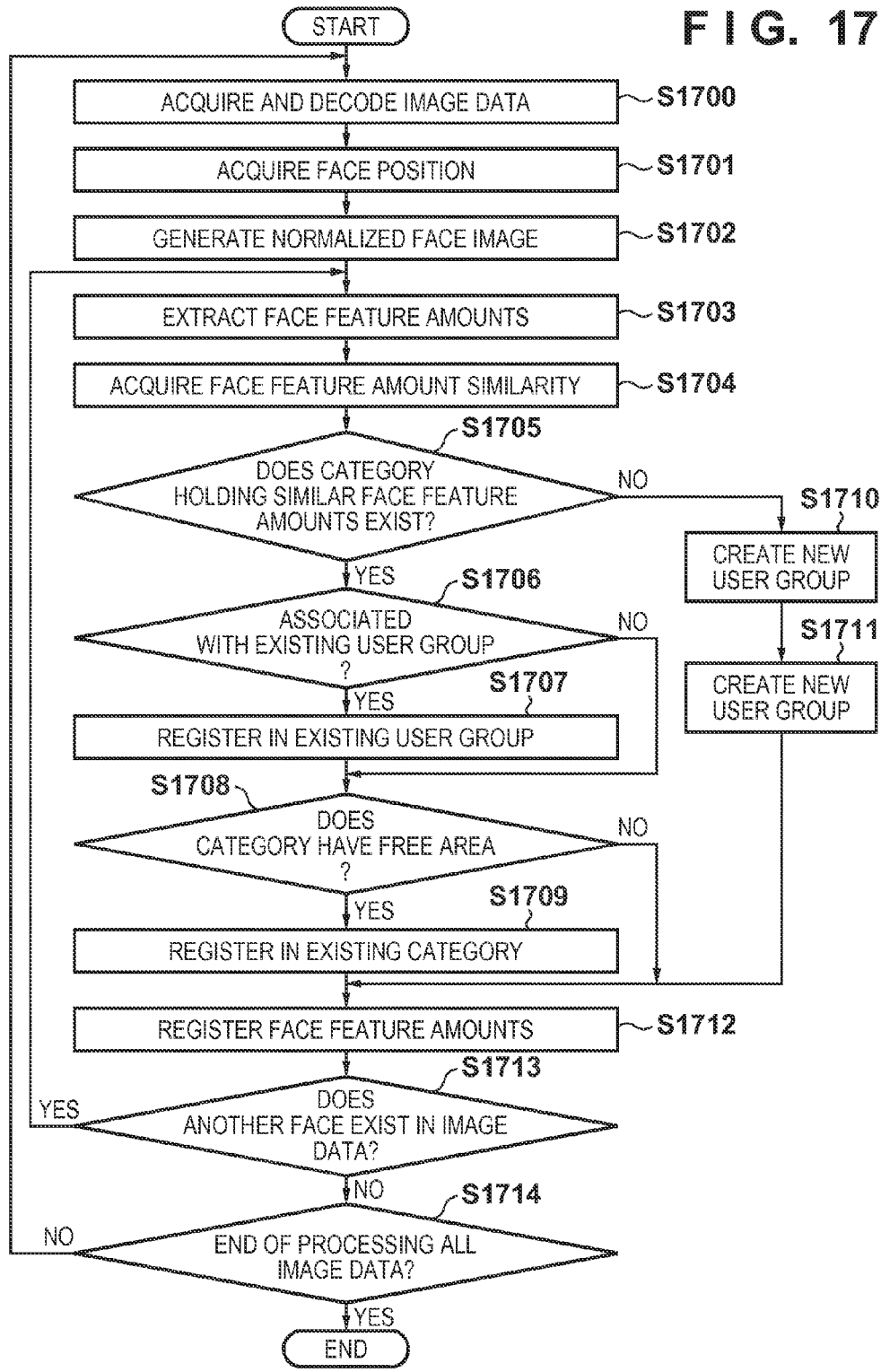
FIG. 17 is a flowchart showing details of face dictionary generation.

Note that steps S1700 to S1703 in FIG. 17 have the same processing contents as those of steps S400 to S403 in FIG. 4, and a description thereof will not be repeated.

In step S1704, an image sensing unit 203 acquires a similarity between face feature amounts. In the embodiment, the similarity is obtained by comparing an acquired face feature amount with a "face feature amount derived by a predetermined procedure from a plurality of face feature amounts for identifying a person". A set of face feature amounts for identifying a person will be referred to as a "category". The "face feature amount derived by a predetermined procedure from the category" will be referred to as a "virtual face feature amount". The category will be described later. The similarity is the same as that in the first embodiment, and a description thereof will not be repeated. If there are a plurality of categories to be compared that are registered in a database unit 202, a plurality of similarities are calculated.

In step S1705, the image sensing unit 203 evaluates the similarity obtained in step S1704. It is determined whether there is a category which holds similar face feature amounts. If there is a category which holds similar face feature amounts, that is, the similarity acquired in step S1704 is higher than a predetermined similarity (YES in step S1705), the process advances to step S1706. If there is no category which holds similar face feature amounts, that is, the similarity acquired in step S1704 is equal to or lower than the predetermined similarity between all categories (NO in step S1705), the process advances to step S1710. If none of the face feature amounts to be compared is registered, the process advances to step S1710. The predetermined similarity has been explained in the first embodiment, and a description thereof will not be repeated.

In step S1706, the image sensing unit 203 determines whether the category determined to have a similarity higher than the predetermined similarity is associated with an existing user group. The user group has been explained in the first embodiment, and a description thereof will not be repeated. If the category is associated with an existing user group (YES in step S1706), the process advances to step S1707. If the category is not associated with an existing user group (NO in step S1706), the process advances to step S1708.

In step S1707, the image sensing unit 203 registers the face feature amounts in the existing user group. The registration method has been explained in the first embodiment, and a description thereof will not be repeated.

In step S1708, the image sensing unit 203 determines whether the category has a blank. Here, the category will be described. The category is a set of face feature amounts for identifying a person, in other words, a unit for handling a finite number of face feature amounts in a predetermined similarity range. More specifically, when recognizing a person for whom a specific face feature amount has been extracted, the category manages up to a finite number of (for example, a maximum of five) face feature amounts similar to the face feature amount in a predetermined range. The finite number may be set by giving a predetermined value, or selected and set by the user. Face feature amounts can be selected by associating FaceID with the category.

As described above, a plurality of face feature amounts are used because the face feature amounts of even the same person vary depending on how the person is captured in the image. To raise the recognition tolerance, face feature amounts considering the range of variations are used. To consider the range of variations, face feature amounts calculated from a plurality of face feature amounts are used. The face feature amount calculated from a plurality of face feature amounts serves as the above-mentioned virtual face feature amount. The virtual face feature amount can be used to reduce the risk of erroneous determination arising from personal recognition using one arbitrary.

An example of the structure of the category will be explained with reference to FIG. 18.

CategoryID is an identifier for identifying each category. ReferenceCount, Activation, NameInfo, and Property are the same as those of FIG. 7 in the first embodiment, and a description thereof will not be repeated. IdealFeature will be explained. The virtual face feature amount is recorded in IdealFeature. The virtual face feature amount calculation method will be described. An example of the virtual face feature amount for calculating a similarity can be the average of face feature amounts associated with the category. Note that the virtual face feature amount is not limited to the average of face feature amounts, and only face feature amounts having maximum values may be collected to calculate the average. The average or median may be calculated based on the variance of feature amount elements.

FIG. 18 exemplifies a structure in which a maximum of five FaceIDs are associated with the category. As described above, the category is a set of a finite number of face feature amounts. Hence, associable FaceID can be registered unless the number of FaceIDs has reached a set maximum value. If the number of FaceIDs has reached a set maximum value, no associable FaceID can be registered. In step S1708, to evaluate a margin of registration, the image sensing unit 203 determines whether the category has a blank. If the category has a blank (YES in step S1708), the process advances to step S1709. If the category has no blank (NO in step S1708), the process advances to step S1712.

Although the embodiment uses FaceID to associate a category with a face feature amount, the present invention is not limited to this. For example, a category and entry may be associated in another database, and this database may be referred to.

In step S1709, the image sensing unit 203 associates the target FaceID with the existing category to update the category.

A face feature amount determined to have a similarity equal to or lower than the predetermined similarity cannot be registered in any category. In step S1710, therefore, the image sensing unit 203 creates a new category for the face feature amount, and associates FaceID with it. More specifically, a new code is assigned to the category ID.

In step S1711, the image sensing unit 203 newly creates a user group. Creation and management of the user group have been explained in the first embodiment, and a description thereof will not be repeated.

Subsequent steps S1712 to S1714 correspond to steps S408 to S410 in the first embodiment, their processing contents are the same as those described above, and a description thereof will not be repeated.

Customization of the thus-generated face dictionary will be explained with reference to FIG. 19. Only a difference from the first embodiment will be described. FIG. 19 is a flowchart showing face dictionary customization procedures.

The processing contents of steps S1900 to S1903 are the same as those of steps S1000 to S1003 in FIG. 10, and a description thereof will not be repeated.

In step S1904, the image sensing unit 203 sets a flag (ignorance flag) so that all entries forming the target category are not used at the time of sensing. More specifically, the flag is set in Activation of FIG. 7. For example, it is defined that the sum of sharing levels has reached a predetermined use frequency when Activation is "0", and has not reached it when Activation is "1". The initial value of Activation is set to "0". If the acquired ReferenceCount has reached the predetermined use frequency, Activation remains the initial value.

Note that customization of a category and customization of face feature amounts may coexist. In this case, the following rule can be set in advance. For example, when already evaluated face feature amounts are classified into a category later, the subsequent reference count and usage of them in the category are preferentially considered. Alternatively, the use frequency of the face feature amounts may be cleared after classification into the category. In any case, confusion can be avoided by making a rule for the usage.

In step S1905, the image sensing unit 203 determines whether all categories in the face dictionary have been evaluated. If all categories have not been evaluated (NO in step S1905), the process returns to step S1900. If all categories have been evaluated (YES in step S1905), the process ends. In this fashion, the face dictionary can be categorized. Note that the evaluation scale to be used is not limited to the use frequency. Also, the customization method can use a plurality of use frequencies, as described in the third embodiment. Another example of the use frequency has been described in the first embodiment, and a description thereof will not be repeated.

The difference between the fifth embodiment and the first embodiment is which of the face feature amount or virtual face feature amount is used. The fifth embodiment can be implemented in combination with the second or third embodiment.

As described above, according to the fifth embodiment, face feature amounts in a predetermined similarity range are managed as one category belonging to each person. A face dictionary considering states of a person such as various expressions can be built.

<Sixth Embodiment>

The sixth embodiment will describe a method of designating a category not to be used in dictionary customization. The hardware arrangement and software arrangement in the sixth embodiment are the same as those in the first embodiment, and a description thereof will not be repeated.

FIG. 20 is a flowchart showing face dictionary customization procedures according to the sixth embodiment.

In step S2000, an image sensing unit 203 acquires a system status. The system status is, for example, the remaining capacity of a secondary storage apparatus 103, or the total number of categories registered in a database unit 202. The image sensing unit 203 acquires such a value, and determines whether the acquired value is larger than a predetermined value. If the image sensing unit 203 determines that the acquired value is equal to or smaller than the predetermined value (YES in step S2000), the process ends. If the image sensing unit 203 determines that the acquired value is larger than the predetermined value (NO in step S2000), the process advances to step S2001.

In step S2001, the image sensing unit 203 acquires and evaluates a use frequency. As the use frequency to be acquired, NameInfo in FIG. 7 is used.

In step S2002, the image sensing unit 203 evaluates the use frequency acquired in step S2001. In the embodiment, if NameInfo remains the initial value, the image sensing unit 203 determines that no predetermined use frequency is satisfied (NO in step S2002), and the process advances to step S2003. Note that it can be determined that the user has little interest in the target person when the predetermined use frequency is not satisfied. If the image sensing unit 203 determines that the predetermined use frequency is satisfied (YES in step S2002), the process advances to step S2004. Note that it can be determined that the user is interested in the target person when the predetermined use frequency is satisfied.

In step S2003, the image sensing unit 203 erases the target category.

Step S2004 has the same processing contents as those of step S1905 in the fourth embodiment, and a description thereof will not be repeated.

As described above, according to the sixth embodiment, the accuracy of the face dictionary can be increased by erasing an entry which does not satisfy a predetermined use frequency. The size of the face dictionary can be reduced by erasing, of the entries of the face dictionary, an entry which does not satisfy the predetermined use frequency. By decreasing the number of entries, the face dictionary reference count accompanying personal recognition can be reduced to increase the processing speed.

<Other Embodiments>

The above-described embodiments are examples for obtaining the effects of the present invention. If the same effects as those of the present invention are obtained by using another similar method or different parameters, this also falls within the scope of the invention.

Although the use of a predetermined entry is inhibited by setting the flag in the first to fifth embodiments, the predetermined entry may be deleted from the face dictionary. This can reduce the size of the face dictionary. By decreasing the number of entries, the face dictionary reference count accompanying personal recognition can be reduced to increase the processing speed.

The above-described embodiments have explained, as a layout output, an output in which a plurality of images are arranged on one page. However, the present invention is also applicable to output of a plurality of pages.

The above-described embodiments have explained a case in which generation and collation of the face dictionary are performed simultaneously, but generation and collation of the face dictionary may be performed separately. For example, either the face dictionary generation mode or collation mode may be used separately in folder scanning. In this case, when a folder is scanned using the face dictionary generation mode, the processing can skip steps S405 to S407 in FIG. 4 and be executed. To the contrary, when a folder is scanned using the collation mode, the processing can skip step S408 in FIG. 4 and be executed. In this case, two scans in the face dictionary generation mode and collation mode are necessary when performing personal recognition for an image included in the folder for which the face dictionary has been generated.

Although the above-described embodiments have exemplified a person's face as an object, the object is not limited to a person's face. A pet's face can be set as an object by performing recognition processing for a pet such as a dog or cat to recognize it. Since even a building, small item, or the like can be recognized by recognizing a shape by edge detection or the like, it can also be set as an object. In these cases, image processing can be performed by the same method as those in the above-described embodiments by extracting the feature amounts of an object and registering them in the dictionary.

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154010, filed Jul. 9, 2012, which is hereby incorporated by reference herein in its entirety.

What is claimed is:

1. An apparatus comprising:
one or more processors;
a memory storing a program to be executed by the one or more processors, wherein the program causes the one or more processors to execute;
converting input image data to a bitmap data format;
extracting feature information of an object of interest in the input image data from the input image data of the bitmap data format;
referring to a dictionary and determining a similarity between feature information of an object registered in the dictionary and the feature information of the object of interest extracted from the input image data, wherein, in the dictionary, feature information of a plurality of objects are stored, each feature information is classified into one of a plurality of object-groups based on the similarity, and each feature information is associated with the image data in which an object represented by the feature information is included;
registering, in the dictionary, the feature information of the object of the interest extracted from the input image data;
determining whether a number of common images between an object-group of interest in the plurality of object-groups and object-groups other than the object-group of interest satisfy a predetermined criterion; and
if the number of common images does not satisfy the predetermined criterion, updating the dictionary so that the feature information included in the object-group of interest is unusable when the dictionary is used for determining.

2. The apparatus according to claim 1, wherein use of the feature information included in the object-group of interest is inhibited by setting a flag for the feature information not to be used when the dictionary is used for determining.

3. The apparatus according to claim 1, wherein use of the feature information included in the object-group of interest is inhibited by deleting, from the dictionary, the feature information.

4. The apparatus according to claim 1, wherein the predetermined criterion is whether the number of common images between the object group of interest and object-groups other than the object group of interest is not smaller than a threshold.

5. The apparatus according to claim 1, wherein the program further causes the one or more processors to execute:
managing the timings of the determining and the updating.

6. The apparatus according to claim 1, wherein the program further causes the one or more processors to execute:
inputting image data; and
detecting an object within the input image data.

7. The apparatus according to claim 1, wherein the dictionary is used for identifying a person.

8. The apparatus according to claim 1, wherein the object is a face of a person.

9. The apparatus according to claim 1, wherein the similarity is determined using a virtual feature amount obtained from a plurality of feature information registered in the dictionary as the feature information of an object registered in the dictionary.

10. The apparatus according to claim 1, wherein the updating of the dictionary is executed when the use time of dictionary exceeds a predetermined time.

11. The apparatus according to claim 1, wherein the updating of the dictionary is executed based on the number of input images from when the previous updating exceeds.

12. The apparatus according to claim 1, wherein the updating of the dictionary is executed based on the number of feature information registered in the dictionary.

13. A method executed in an image processing apparatus, comprising:
converting input image data to a bitmap data format;
extracting, from the input image data, feature information of an object of interest in the input image data of the bitmap data format;
referring to a dictionary and determining a similarity between feature information of an object registered in the dictionary and the feature information of the object of interest extracted in the extraction step, wherein in the dictionary, feature information of a plurality of objects are stored, each feature information is classified into one of a plurality of object-groups, and each feature information is associated with the image data in which an object represented by the feature information is included;
registering, in the dictionary, the feature information of the object of interest extracted from the input image;
determining whether a number of common images between an object-group of interest in the plurality of object-groups and object-groups other than the object-group of interest satisfies a predetermined criterion; and
if the number of common images does not satisfy the predetermined criterion, updating the dictionary so that the feature information included in the object-group of interest is unusable when the dictionary is used for determining.

14. The method according to claim 13, wherein use of the feature information included in the object-group of interest is inhibited by setting a flag for the feature information not to be used in the referring.

15. The method according to claim 13, wherein use of the feature of information included in the object-group of interest is inhibited by deleting, from the dictionary, the feature information.

16. The method according to claim 13, wherein the dictionary is used for identifying a person.

17. The method according to claim 13, wherein the object is a face of a person.

18. The method according to claim 13, wherein the similarity is determined using a virtual feature amount obtained from a plurality of feature information registered in the dictionary.

19. A non-transitory computer-readable storage medium storing a program for causing a computer to function, the program causing the computer to execute:
converting input image data to a bitmap data format;
extracting, from the input image data, feature information of an object of interest in the input image data of the bitmap data format;
referring to a dictionary and determining a similarity between feature information of an object registered in the dictionary and the feature information of the object of interest extracted in the extraction step, wherein in the dictionary, feature information of a plurality of objects are stored, each feature information is classified into one of a plurality of object-groups, and each feature information is associated with the image data in which an object represented by the feature information is included;

registering, in the dictionary, the feature information of the object of interest extracted from the input image;

determining whether a number of common images between an object-group of interest in the plurality of object-groups and object-groups other than the object-group of interest satisfies a predetermined criterion; and if the number of common images does not satisfy the predetermined criterion, updating the dictionary so that the feature information included in the object-group of interest is unusable when the dictionary is used for determining.

* * * * *